US012750561B2

(12) United States Patent
Morita et al.

(10) Patent No.: US 12,750,561 B2
(45) Date of Patent: Sep. 29, 2026

(54) DATA PROCESSING DEVICE AND DATA PROCESSING METHOD

(71) Applicant: SONY GROUP CORPORATION, Tokyo (JP)

(72) Inventors: Hiroshi Morita, Tokyo (JP); Hiroshi Kuno, Tokyo (JP); Kazumoto Kondo, Tokyo (JP); Kazuaki Toba, Tokyo (JP); Masanari Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/864,552

(22) PCT Filed: May 9, 2023

(86) PCT No.: PCT/JP2023/017383

§ 371 (c)(1),
(2) Date: Nov. 11, 2024

(87) PCT Pub. No.: WO2023/223882

PCT Pub. Date: Nov. 23, 2023

(65) Prior Publication Data

US 2025/0310616 A1 Oct. 2, 2025

(30) Foreign Application Priority Data

May 17, 2022 (JP) ................................ 2022-080726

(51) Int. Cl.
*H04N 21/647* (2011.01)
*H04B 10/40* (2013.01)
*H04L 7/033* (2006.01)

(52) U.S. Cl.
CPC ....... *H04N 21/64792* (2013.01); *H04B 10/40* (2013.01); *H04L 7/033* (2013.01)

(58) Field of Classification Search
CPC ... H04N 21/64792; H04B 10/40; H04L 7/033
See application file for complete search history.

(56) References Cited

U.S. PATENT DOCUMENTS 6,603,816 B1 * 8/2003 Hamada ............ H04N 21/4112 375/E7.278
6,903,587 B2 * 6/2005 Sasaki .................... H04L 7/005 375/362

(Continued)

FOREIGN PATENT DOCUMENTS

JP 2012-205204 A 10/2012
JP 2014-120920 A 6/2014

(Continued)

OTHER PUBLICATIONS

International Search Report and Written Opinion of PCT Application No. PCT/JP2023/017383, issued on Aug. 1, 2023, 09 pages of ISRWO.

*Primary Examiner* — Michael B. Pierorazio
(74) *Attorney, Agent, or Firm* — CHIP LAW GROUP

(57) ABSTRACT

The CDR in a reception device (sink device) at a subsequent stage can be prevented from being unlocked even when jitter-fluctuation occurs due to transmission via an unstable transmission path such as a network. The clock data recovery unit extracts a clock and data on the basis of the baseband video data of a first format corresponding to a predetermined transmission path input from the predetermined transmission path. The extracted data is processed by the processing unit on the basis of the extracted clock. In this case, in a case where the occurrence of the jitter-fluctuation is detected, dummy data capable of clock extraction at the subsequent stage is output. For example, the processing unit outputs baseband video data in a second format, and the (Continued)

baseband video data in the second format is baseband video data corresponding to a predetermined wired interface.

17 Claims, 15 Drawing Sheets

(56) References Cited

U.S. PATENT DOCUMENTS 8,019,022 B2 * 9/2011 Liu .......................... H04L 7/027 375/326
8,989,246 B2 * 3/2015 Wu ........................ H03L 7/0807 375/228
10,448,090 B2 * 10/2019 Choi ...................... H04N 19/46
11,438,199 B1 * 9/2022 Xu ........................ H04L 43/028
2006/0248559 A1 * 11/2006 Michener ............. H04N 21/233 725/147
2008/0028425 A1 * 1/2008 Inui ........................ H04N 5/602 725/38
2009/0148155 A1 * 6/2009 Latchman ............ H04B 10/697 398/2
2011/0193970 A1 * 8/2011 Zhu .................... H04N 21/4305 348/180
2015/0163501 A1 * 6/2015 Cho .................... H04L 12/2854 375/240.26
2015/0326385 A1 * 11/2015 Hashida .................. H04L 7/033 375/359
2017/0373918 A1 * 12/2017 Kwak ................ H04N 21/4345
2019/0044627 A1 * 2/2019 Cohen ..................... H04B 17/29
2020/0014969 A1 * 1/2020 Lau .................... H04N 21/4305

FOREIGN PATENT DOCUMENTS

JP 2019-097080 A 6/2019
JP 2021-034901 A 3/2021
WO 2017/057152 A1 4/2017

* cited by examiner

UPSTREAM COMMUNICATION

DOWNSTREAM COMMUNICATION

FIG. 2A WAVELENGTH DIVISION MULTIPLEXING (WDM)
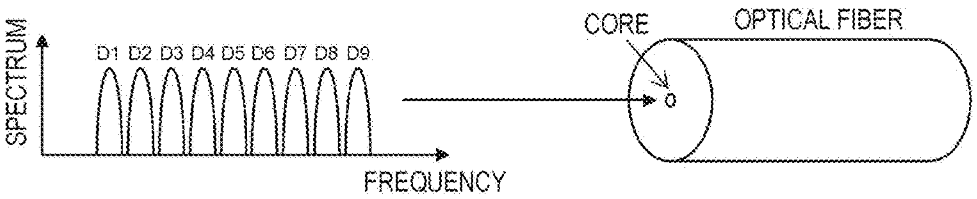
FIG. 2B POLARIZATION DIVISION MULTIPLEXING (PDM)
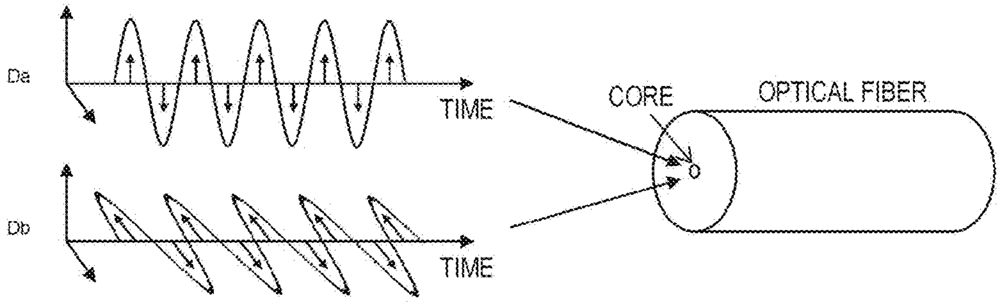
FIG. 2C SPACE DIVISION MULTIPLEXING (SDM)
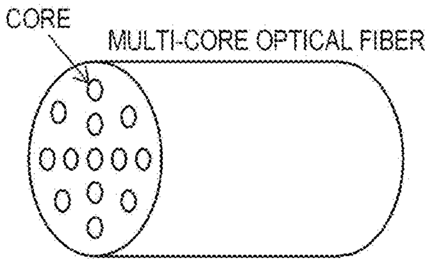

UPSTREAM COMMUNICATION

DOWNSTREAM COMMUNICATION

DATA PROCESSING DEVICE AND DATA PROCESSING METHOD

CROSS REFERENCE TO RELATED APPLICATIONS

This application is a U.S. National Phase of International Patent Application No. PCT/JP2023/017383 filed on May 9, 2023, which claims priority benefit of Japanese Patent Application No. JP 2022-080726 filed in the Japan Patent Office on May 17, 2022. Each of the above-referenced applications is hereby incorporated herein by reference in its entirety.

TECHNICAL FIELD

The present technology relates to a data processing device and a data processing method, and more particularly to a data processing device or the like that processes baseband video data via an unstable transmission path such as a network.

BACKGROUND ART

High-definition multimedia interface (HDMI) is the most popular wired interface standard for transmitting baseband video data to a display such as a television. Note that “HDMI” is a registered trademark. The HDMI is directly connected by a cable, and it is not assumed that data is interrupted.

Conventionally, a network system for data transmission is known (refer to, for example, Patent Document 1). In a case where the baseband video data of the HDMI described above is transmitted via a network which is an unstable path, there is a problem that every time data is interrupted on an intermediate path, that is, every time jitter-fluctuation occurs, clock data recovery (CDR) of a sink device is unlocked and a link is interrupted, and a black image of several seconds occurs.

CITATION LIST

Patent Document

Patent Document 1: WO 2017/057152

SUMMARY OF THE INVENTION

Problems to be Solved by the Invention

An object of the present technology is to prevent the CDR in a reception device (sink device) at the subsequent stage from being unlocked even if, for example, jitter-fluctuation occurs due to transmission via an unstable transmission path such as a network.

Solutions to Problems

A concept of the present technology is a data processing device including:

a clock data recovery unit that extracts a clock and data on the basis of baseband video data in a first format corresponding to a predetermined transmission path, the baseband video data being input from the predetermined transmission path; and a processing unit that processes the extracted data on the basis of the extracted clock, in which the processing unit outputs dummy data capable of clock extraction at a subsequent stage in a case where occurrence of jitter-fluctuation is detected.

In the present technology, the clock data recovery unit extracts a clock and data on the basis of the baseband video data of a first format corresponding to a predetermined transmission path input from the predetermined transmission path. For example, the predetermined transmission path may be an optical communication network.

The extracted data is processed by the processing unit on the basis of the extracted clock. In this case, in a case where the occurrence of the jitter-fluctuation is detected, dummy data capable of clock extraction at the subsequent stage is output. For example, the processing unit may output baseband video data in a second format, and the baseband video data in the second format may be baseband video data corresponding to a predetermined wired interface. In this case, for example, the predetermined wired interface may be an HDMI or a DisplayPort. Note that it is also conceivable that the processing unit outputs the baseband video data in the first format without performing format conversion.

Furthermore, for example, the dummy data may be copy video data in units of frames or lines. Therefore, it is possible to reduce the user’s uncomfortable feeling about the disturbance of the display video due to the jitter-fluctuation in the reception device (sink device) at the subsequent stage.

As described above, in the present technology, the processing unit that processes the data extracted by the clock data recovery unit on the basis of the clock extracted by the clock data recovery unit outputs the dummy data capable of clock extraction at the subsequent stage in a case where the occurrence of the jitter-fluctuation is detected. Even when the jitter-fluctuation occurs, the CDR of the reception device (sink device) at the subsequent stage can be prevented from being unlocked, link training when the jitter-fluctuation is resolved can be made unnecessary, and generation of a black image of several seconds each time the jitter-fluctuation occurs can be prevented.

Note that, in the present technology, for example, in a case where the occurrence of the jitter-fluctuation is detected, the clock data recovery unit may continue to output the clock in the state immediately after the occurrence of the jitter-fluctuation. Therefore, even in a case where the jitter-fluctuation occurs, the processing unit can satisfactorily perform processing by using the clock continuously output from the clock data recovery unit, and the clock data recovery unit does not need link training when the jitter-fluctuation is resolved.

In this case, for example, the clock data recovery unit may include: a phase detector that detects a phase difference between baseband video data in the first format and an extraction clock and outputs an analog amount corresponding to the phase difference; a low-pass filter that smooths an output of the phase detector; and a voltage-controlled oscillator in which an output of the low-pass filter is input to a control voltage terminal to output the extraction clock. In a case where occurrence of jitter-fluctuation is detected, a voltage input to a control voltage terminal of the voltage-controlled oscillator may be fixed to an output of the low-pass filter immediately after the occurrence of the jitter-fluctuation. Therefore, the voltage-controlled oscillator can continuously output a clock in a state immediately after the jitter-fluctuation occurs.

Here, for example, the clock data recovery unit may further include a voltage copy circuit that copies and holds an output of the low-pass filter. An output side of the low-pass filter may be brought into a state of being disconnected from a state of being connected to the voltage copy circuit, and an input side of the low-pass filter may be brought into a state in which a voltage held in the voltage copy circuit is input from a state in which an output of the phase detector is input, on the basis of a jitter-fluctuation occurrence detection signal. Note that, for example, the jitter-fluctuation occurrence detection signal may be generated by the processing unit. Furthermore, for example, the clock data recovery unit may further include a circuit that compares an output of the low-pass filter with a threshold and generates the jitter-fluctuation occurrence detection signal. Therefore, in a case where the occurrence of the jitter-fluctuation is detected, the voltage input to the control voltage terminal of the voltage-controlled oscillator can be fixed to the output of the low-pass filter immediately after the occurrence of the jitter-fluctuation.

Then, for example, an output side of the low-pass filter may be brought into the connected state from the disconnected state with respect to the voltage copy circuit, and an input side of the low-pass filter may be brought into a state in which an output of the phase detector is input from a state in which a voltage held in the voltage copy circuit is input, on the basis of the jitter-fluctuation resolution detection signal. Note that, for example, the jitter-fluctuation resolution detection signal may be generated by the processing unit. Therefore, in a case where the resolution of the jitter-fluctuation is detected, the voltage input to the control voltage terminal of the voltage-controlled oscillator becomes a voltage corresponding to the phase difference between the baseband video data of the first format and the extraction clock, and the state returns to a state in which the clock synchronized with the baseband video data of the first format is extracted. Note that since the clock in the state immediately after the jitter-fluctuation occurs is continuously output, link training when the jitter-fluctuation is resolved is unnecessary.

Furthermore, in this case, for example, the clock data recovery unit may further include a capacitor disposed between a control voltage terminal of the voltage-controlled oscillator and ground, and an output side of the low-pass filter may be brought into a disconnected state from a connected state with respect to a control voltage terminal of the voltage-controlled oscillator on the basis of a jitter-fluctuation occurrence detection signal. Therefore, in a case where the occurrence of the jitter-fluctuation is detected, the voltage input to the control voltage terminal of the voltage-controlled oscillator can be fixed to the output of the low-pass filter immediately after the occurrence of the jitter-fluctuation.

Then, in this case, for example, an output side of the low-pass filter may be brought into a connected state from a disconnected state with respect to a control voltage terminal of the voltage-controlled oscillator on the basis of a jitter-fluctuation resolution detection signal. Note that, for example, the clock data recovery unit may further include a circuit that compares an output of the low-pass filter with a threshold and generates the jitter-fluctuation occurrence detection signal and the jitter-fluctuation resolution detection signal. Therefore, in a case where the resolution of the jitter-fluctuation is detected, the voltage input to the control voltage terminal of the voltage-controlled oscillator becomes a voltage corresponding to the phase difference between the baseband video data of the first format and the extraction clock, and the state returns to a state in which the clock synchronized with the baseband video data of the first format is extracted. Note that since the clock in the state immediately after the jitter-fluctuation occurs is continuously output, link training when the jitter-fluctuation is resolved is unnecessary.

Furthermore, another concept of the present technology is a data processing method including:

- a clock data recovery procedure of extracting a clock and data on the basis of baseband video data input from a predetermined transmission path and having a format corresponding to the predetermined transmission path; and
- a processing procedure of processing the extracted data on the basis of the extracted clock, in which
- in the processing procedure, in a case where occurrence of jitter-fluctuation is detected, dummy data capable of clock extraction at a subsequent stage is output.

Furthermore, another concept of the present technology is a data processing device including:

- a clock data recovery unit that extracts a clock and data on the basis of input data, in which
- in a case where an input of data not capable of clock extraction is detected, the clock data recovery unit continues to output a clock in a state immediately after an input of the data.

In the present technology, the clock and the data are extracted on the basis of the input data by the lock data recovery unit. Then, in a case where the input of the data not capable of clock extraction is detected, for example, in a case where the occurrence of the jitter-fluctuation is detected, the lock data recovery unit continues to output the clock in the state immediately after the input of the data.

For example, the clock data recovery unit may include: a phase detector that detects a phase difference between input data and an extraction clock and outputs an analog amount corresponding to the phase difference; a low-pass filter that smooths an output of the phase detector; and a voltage-controlled oscillator in which an output of the low-pass filter is input to a control voltage terminal to output the extraction clock. In a case where occurrence of jitter-fluctuation is detected, a voltage input to a control voltage terminal of the voltage-controlled oscillator may be fixed to an output of the low-pass filter immediately after the occurrence of the jitter-fluctuation. Therefore, the voltage-controlled oscillator can continuously output a clock in a state immediately after the jitter-fluctuation occurs.

In this case, for example, the clock data recovery unit may further include a voltage copy circuit that copies and holds an output of the low-pass filter. An output side of the low-pass filter may be brought into a disconnected state from a connected state with respect to the voltage copy circuit, and an input side of the low-pass filter may be brought into a state in which a voltage held in the voltage copy circuit is input from a state in which an output of the phase detector is input, on the basis of a jitter-fluctuation occurrence detection signal. An output side of the low-pass filter may be brought into the connected state from the disconnected state with respect to the voltage copy circuit, and an input side of the low-pass filter may be brought into a state in which an output of the phase detector is input from a state in which a voltage held in the voltage copy circuit is input, on the basis of a jitter-fluctuation resolution detection signal.

Therefore, in a case where the occurrence of the jitter-fluctuation is detected, the voltage input to the control voltage terminal of the voltage-controlled oscillator can be fixed to the output of the low-pass filter immediately after the occurrence of the jitter-fluctuation. Furthermore, in a case where the resolution of the jitter-fluctuation is detected, the voltage input to the control voltage terminal of the voltage-controlled oscillator becomes a voltage according to the phase difference between the input data and the extraction clock, and the state returns to a state in which the clock synchronized with the input data is extracted. Note that since the clock in the state immediately after the jitter-fluctuation occurs is continuously output, link training when the jitter-fluctuation is resolved is unnecessary.

Furthermore, in this case, for example, the clock data recovery unit may further include a capacitor disposed between a control voltage terminal of the voltage-controlled oscillator and ground. An output side of the low-pass filter may be brought into a disconnected state from a connected state with respect to a control voltage terminal of the voltage-controlled oscillator on the basis of a jitter-fluctuation occurrence detection signal. An output side of the low-pass filter may be brought into a connected state from a disconnected state with respect to a control voltage terminal of the voltage-controlled oscillator on the basis of a jitter-fluctuation resolution detection signal.

As described above, in the present technology, in a case where the input of the data not capable of clock extraction is detected, the clock data recovery unit continues to output the clock in the state immediately after the input of the data, and even in a case where the input of the data not capable of clock extraction is detected, the subsequent processing unit can satisfactorily perform the processing by using the clock continuously output from the clock data recovery unit, and the clock data recovery unit does not need the link training when returning to the input of the data capable of clock extraction.

BRIEF DESCRIPTION OF DRAWINGS

FIGS. 2A, 2B, and 2C are diagrams for explaining an example of a system capable of alleviating limitation on an amount of data that can be communicated.

MODE FOR CARRYING OUT THE INVENTION

Hereinafter, a mode for carrying out the invention (hereinafter referred to as an "embodiment") will be described. Note that, the description will be given in the following order.

1. Embodiment
2. Modification

<1. EMBODIMENT

Description of Related Technology

Figure 1A:
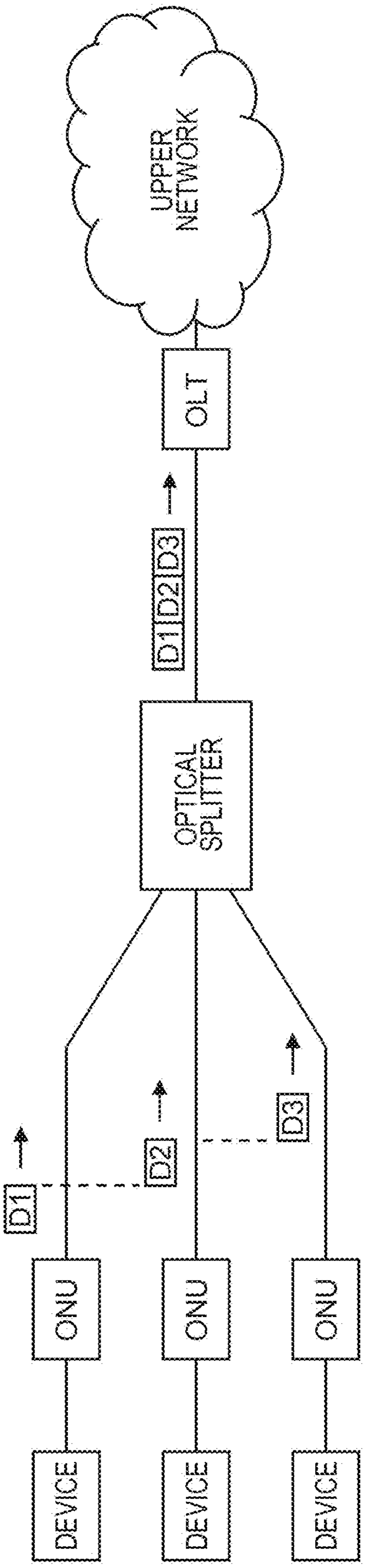
FIGS. 1A and 1B are diagrams illustrating an example of an optical network system.
Figure 1B:
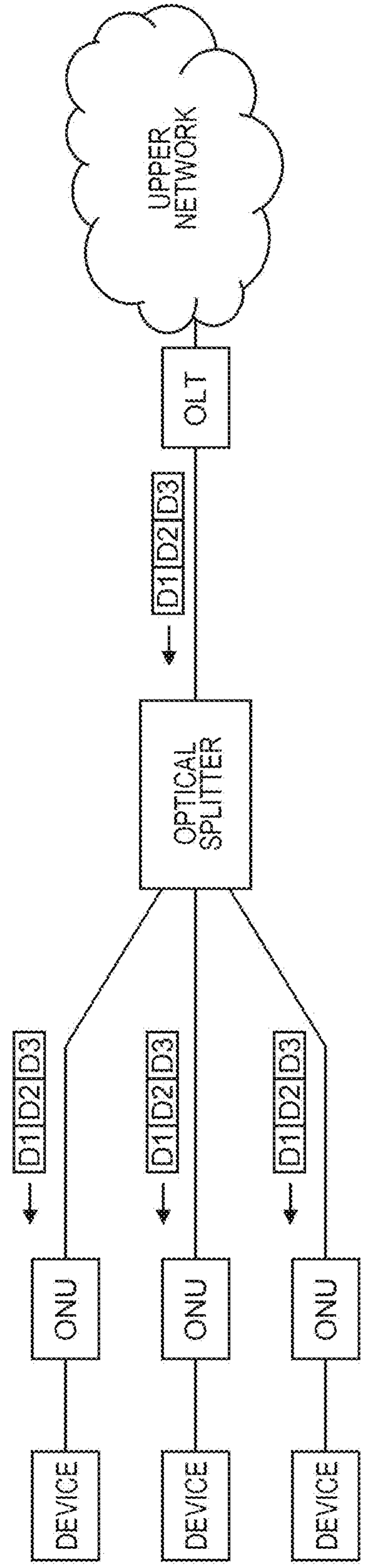

First, a technology related to the present technology will be described. For example, a current network access network such as a passive optical network (PON) is considered. As illustrated in FIGS. 1A and 1B, communication can be performed between an optical line terminal (OLT) on a base station side and optical network units (ONUs) on a side of a plurality of users by using an optical splitter. The OLT is connected to the optical splitter by one fiber, and is connected to respective users with light split by the optical splitter.

In a case of upstream communication as illustrated in FIG. 1A, data output from the ONU of each user side, which are D1, D2, and D3 in the illustrated example, are multiplexed by the optical splitter. In order to avoid duplication, they are multiplexed in a time axis direction with a data transmission timing and a data transmission amount controlled among the ONUs. In a case of downstream communication as illustrated in FIG. 1B, data output from the OLT, which is data obtained by multiplexing D1, D2, and D3 in the time axis direction in the illustrated example, is commonly transmitted to the ONU on each user side via the optical splitter. At that time, the ONU on each user side extracts only data addressed to the ONU itself. Note that, wavelengths of optical signals of the upstream communication and the downstream communication are different from each other, so that communication can be performed without interference even if the data overlaps on the time axis.

As described above, in the current network access network, connection between the device on each user side and the network is superimposed (time division multiplexing) in the time axis direction in order to avoid conflict with a large number of devices, and the amount of data that can be communicated is limited.

Studies have been conducted to alleviate limitation on the amount of data that can be communicated described above. FIGS. 2A, 2B, and 2C illustrate an example of a system capable of alleviating the limitation on the amount of data that can be communicated. FIG. 2A illustrates a wavelength division multiplexing (WDM) system, the system that uses a characteristic that light does not interfere when wavelengths are different, adds data to each of a plurality of wavelengths, enables communication of a plurality of data with one optical fiber, and increases the amount of data that can be communicated.

FIG. 2B illustrates a polarization division multiplexing (PDM) system, the system that uses a characteristic that light has a component that advances while vertically vibrating and a component that advances while horizontally vibrating, and these two components do not interfere with each other, adds data to each of the two components, enables communication of two data with one optical fiber, and increases the amount of data that can be communicated.

FIG. 2C illustrates a space division multiplexing (SDM) system in which a plurality of cores is provided in one optical fiber to enable communication without physical interference of a plurality of data, and increase the amount of data that can be communicated. Note that, by combining these systems, the amount of data that can be communicated can be further increased.

Figure 3:
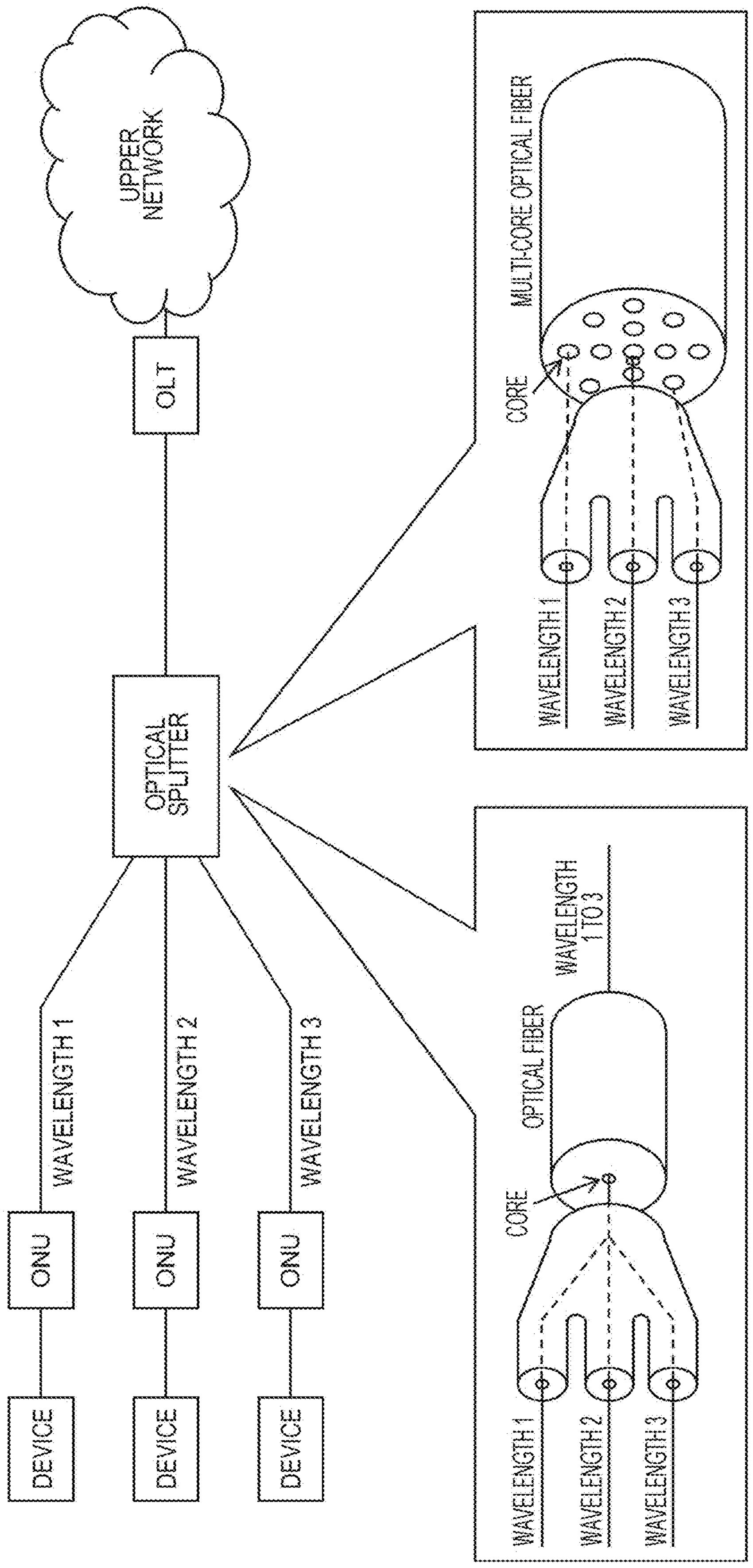
FIG. 3 is a diagram illustrating an example of the optical network system.

In this manner, a plurality of data can be superimposed on one optical fiber without interfering with each other. For example, in a case where the wavelength division multiplexing system is used, as illustrated in FIG. 3, light rays of a plurality of wavelengths coming from the ONUs can be bundled into one by the optical splitter and transmitted to the OLT side. That is, it is not necessary to perform time division multiplexing, and it is possible to communicate between the ONU and the OLT using each wavelength as a dedicated line. Note that, in a case where the wavelength division multiplexing system and the spatial division multiplexing system are combined using a multi-core optical fiber, a band can be further expanded with an increase in the number of cores.

Figure 4A:
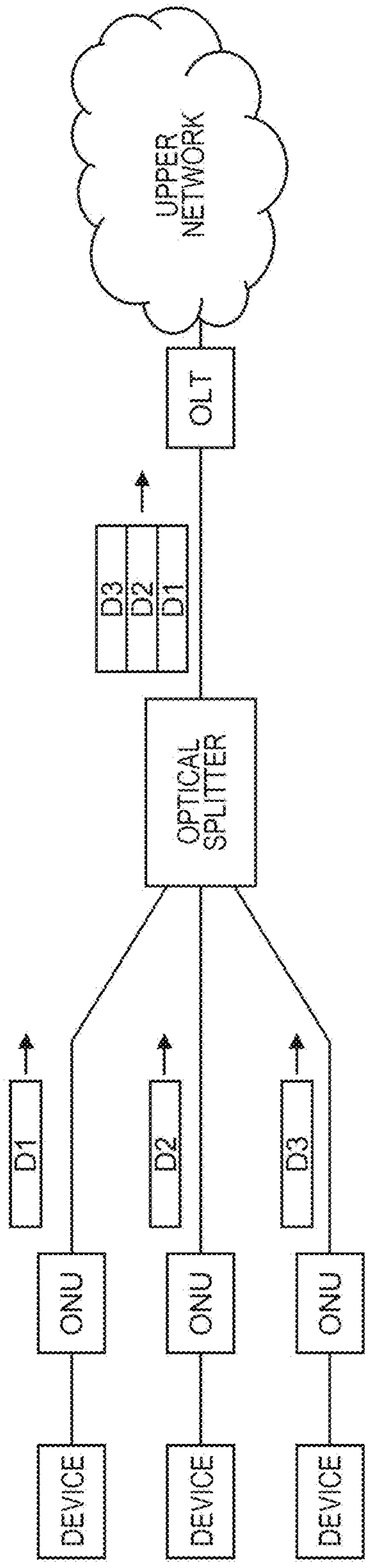
FIGS. 4A and 4B are diagrams for explaining an operation of the optical network system in a case where a wavelength division multiplexing system is used.
Figure 4B:
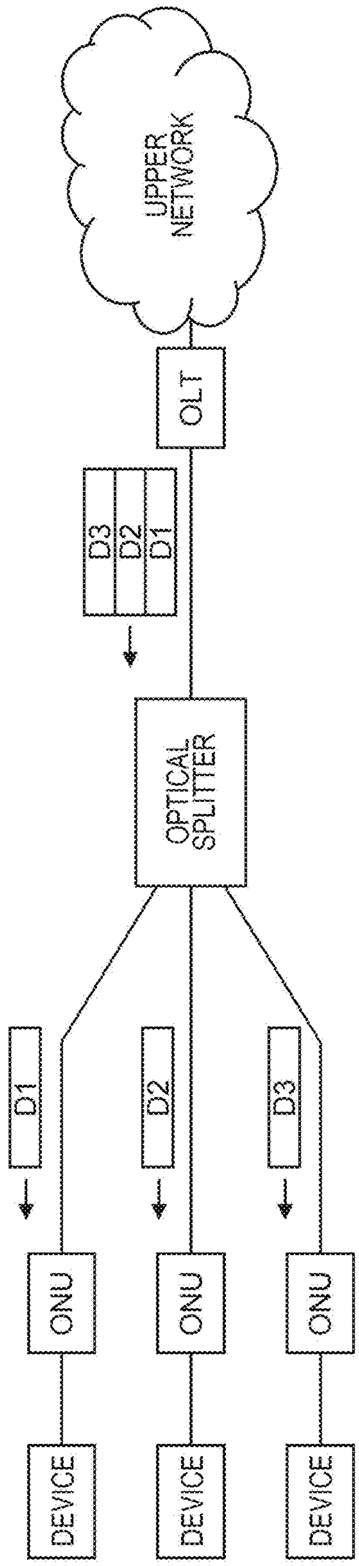

FIGS. 4A and 4B illustrate an example of communication between the OLT on the base station side and the ONUs on the side of a plurality of users in a case where the wavelength division multiplexing system is used, for example. In a case of upstream communication as illustrated in FIG. 4A, data output from the ONU on each user side, which are D1, D2, and D3 in the illustrated example, have different wavelengths, so that they do not interfere even when being bundled by the optical splitter, and can be transmitted to the OLT with one fiber. Therefore, the device on each user side can transmit data by fully using a time without taking conflict with other devices into consideration. This is similar in a case of downstream communication as illustrated in FIG. 4B.

Note that, FIGS. 4A and 4B illustrate an example of a case where the wavelength division multiplexing system is used, but it is similar in a case where the polarization division multiplexing system or the spatial division multiplexing system is used, and furthermore, it is similar in a case where the respective systems are used in combination.

In a case where a system (hereinafter, referred to as a "new network system") using the above-described wavelength division multiplexing system, polarization division multiplexing system, or spatial division multiplexing system, or a combination of these systems is implemented, a connection such as peer-to-peer (P2P) with a dedicated line can also be implemented as the connection between the devices via the network as illustrated in the network system in FIG. 5.

When each switch/router performs path selection, the respective signals are usually bundled, that is, time-division-multiplexed to be transmitted on an upper layer; however, if the new network system is used, the number of lines that can be used for transmitting as their own dedicated lines dramatically increases, so that the necessity of time division multiplexing is reduced; in an extreme case, the devices via the network can be connected to each other via a dedicated line like P2P connection.

Furthermore, with the progress in optical multiplexing and switching technology, a network path can be established only with an optical switch without using electrical conversion. Before starting communication, the device interacts with the control center, and the control center constructs an optical path by using optical switching for a section to be connected. Thereafter, data transmission is started.

Figure 5:
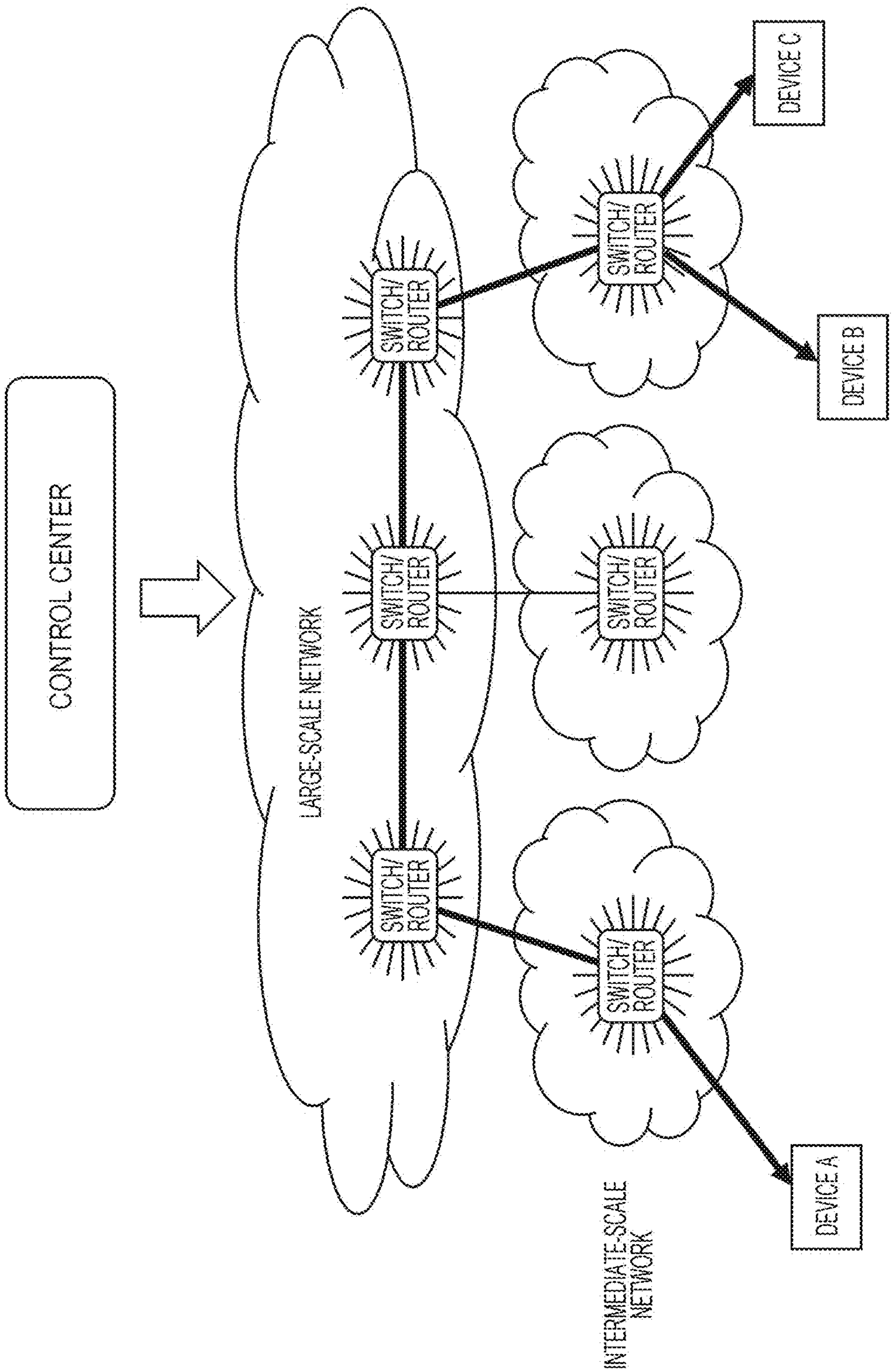
FIG. 5 is a diagram illustrating an example of a network system in which a device on a transmission side and a device on a reception side are connected via a network.

Here, in the network system illustrated in FIG. 5, for example, a case will be considered in which devices via a network such as a device A and a device B are connected by a communication system on the premise of baseband such as High-Definition Multimedia Interface (HDMI) or DisplayPort.

In the above description, it has been described that it is also possible to connect devices via a network by a dedicated line like P2P connection, but in practice, it is difficult to connect from an upper layer to a terminal of the network by one dedicated line due to resource compression, and it is expected that minimum time division is required, or photoelectric conversion is required to distribute destinations of time-divided data.

For example, in the network system illustrated in FIG. 5, when the device A and the device B are connected, if some unnecessary electrical processing occurs on the network, a state in which data is interrupted, that is, so-called jitter-fluctuation occurs, and even if continuous data is transmitted from the device A, there is a blank period in data arriving at the device B, and there is a possibility that a defect such as image disturbance or a black image occurs in the device B.

Figure 6A:
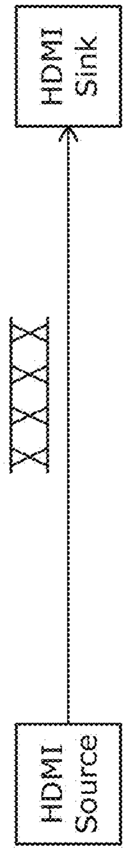
FIGS. 6A and 6B are diagrams illustrating a configuration example of a transmission/reception system in which HDMI devices are directly connected by a cable and a configuration example of a transmission/reception system in which HDMI devices are connected via a network.

FIG. 6A illustrates a configuration example of a transmission/reception system in which HDMI devices are directly connected to each other by a cable. In this configuration example, basically, jitter-fluctuation does not occur, and constant data is always transmitted from the source device to the sink device.

Figure 6B:
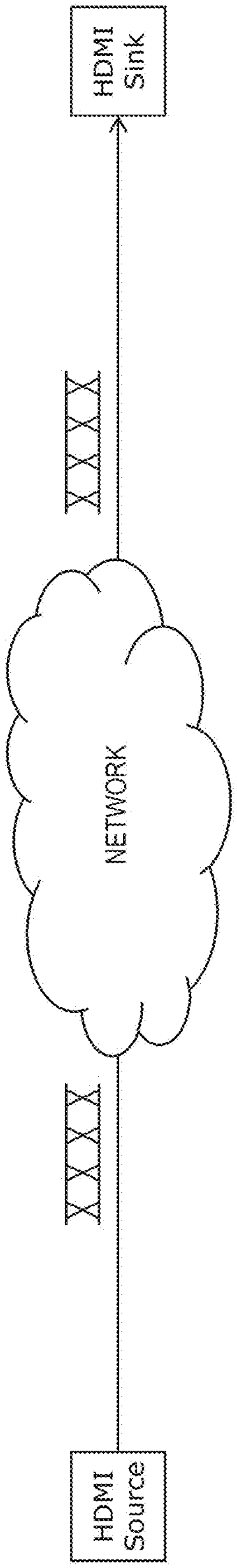

FIG. 6B illustrates a configuration example of a transmission/reception system that connects HDMI devices via a network. In this case, when the jitter-fluctuation occurs in the network, a blank period is generated in the data reaching the sink device, and the sink device cannot cope with the blank period and is unlocked and the link is interrupted. In this case, in order to connect the link between the source device and the sink device again, it is necessary to start over from the initial sequence, and a black image of several seconds occurs every time the jitter-fluctuation occurs in the display on the sink device side.

The main cause of this is that clock data recovery (CDR) in the sink device does not cope with jitter-fluctuation. In a case where the jitter-fluctuation occurs, the input data of the CDR is continuous "1" or continuous "0". Therefore, the CDR is unlocked, and in order to lock the CDR again, it is necessary to send a dedicated pattern for locking the CDR by link training from the source device to the sink device.

Not limited to the HDMI, the CDR is compatible with uninterrupted input data, and a case where jitter-fluctuation occurs is not assumed. However, for example, when the HDMI devices are connected to each other via a network and used, it is a new problem that the CDR in the sink device does not cope with the jitter-fluctuation.

The present technology makes it possible to prevent the CDR in the reception device (sink device) at the subsequent stage from being unlocked even when jitter-fluctuation occurs due to transmission via an unstable transmission path such as a network.

Configuration Example of Transmission/Reception System

Figure 7:
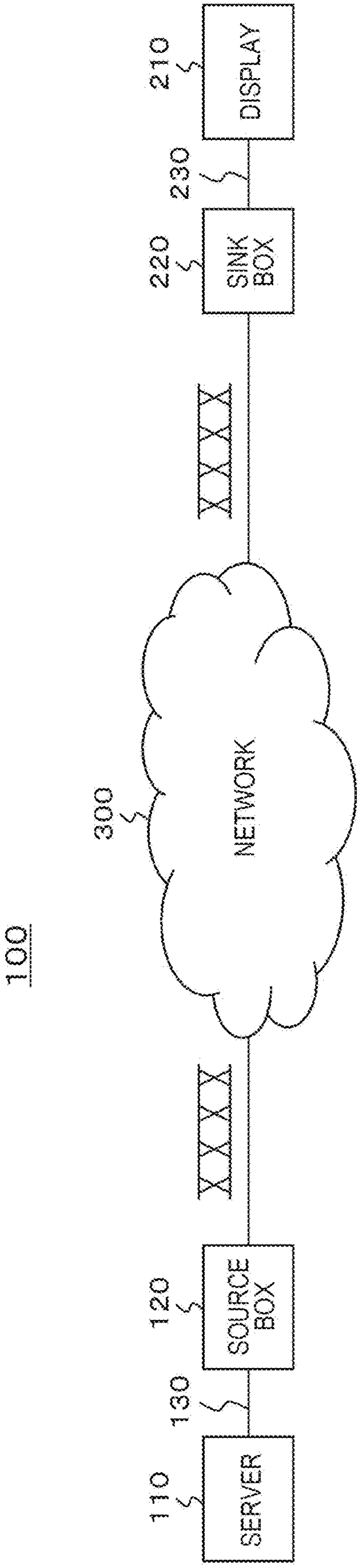
FIG. 7 is a diagram illustrating a configuration example of a transmission/reception system as an embodiment.

FIG. 7 illustrates a configuration example of a transmission/reception system 100 as an embodiment. The transmission/reception system 100 includes a server (game server)

110 as a video transmission device, a source box 120, a display 210 as an HDMI sink device, and a sink box 220, similarly to a video reproduction device, a game device, or the like as an HDMI source device.

Note that, although FIG. 6B illustrates the configuration example of the transmission/reception system that connects the HDMI devices via the network, since the existing HDMI devices do not actually support network connection, it is assumed that the source box 120 is provided on the source side, the sink box 220 is also provided on the sink side, and format conversion (protocol conversion) is performed as illustrated in FIG. 7.

For example, the server 110 exists in a data center and is connected to the source box 120 similarly existing in the data center via an HDMI cable 130. Here, the server 110 constitutes an electronic device that outputs baseband video data. Furthermore, the display 210 exists at home of a game player (user), for example, and is connected to the sink box 220 similarly existing at the home of the game player via an HDMI cable 230. Here, the display 210 constitutes an electronic device that processes the baseband video data. Then, the source box 120 and the sink box 220 are connected via a network, here, an optical communication network 300.

The server 110 transmits the baseband video data to the source box 120 via the HDMI cable 130. The source box 120 converts the baseband video data transmitted from the server 110 via the HDMI cable 130 from a format corresponding to the HDMI into a format corresponding to the optical communication network 300, further converts an electrical signal into an optical signal, and transmits the optical signal to the sink box 220 via the optical communication network 300.

The sink box 220 converts the baseband video data transmitted from the source box 120 via the optical communication network 300 from an optical signal to an electrical signal, further converts the baseband video data from the format corresponding to the optical communication network 300 to the format corresponding to the HDMI, and transmits the converted data to the display 210 via the HDMI cable 230. Therefore, a video based on the baseband video data output from the server 110 is displayed on the display 210.

Here, in a case where the occurrence of the jitter-fluctuation is detected, the sink box 220 outputs dummy data capable of clock extraction in the CDR in the display 210 and sends the dummy data to the display 210. Therefore, even if the jitter-fluctuation occurs, it is possible to avoid the CDR of the display 210 from being unlocked, it is possible to make link training when the jitter-fluctuation is resolved unnecessary, and it is possible to prevent a black image of several seconds from occurring every time the jitter-fluctuation occurs.

In this case, it is also conceivable that the dummy data is copy video data in units of frames or lines. Therefore, it is possible to reduce the user's uncomfortable feeling about the disturbance of the display video due to the jitter-fluctuation in the display 210.

Figure 8:
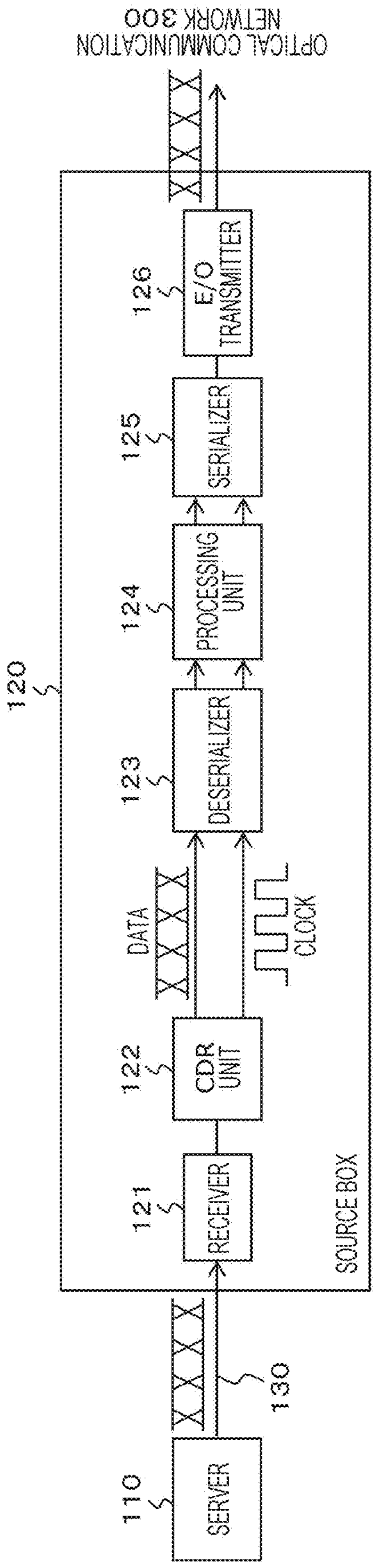
FIG. 8 is a diagram illustrating a configuration example of a source box.

FIG. 8 illustrates a configuration example of the source box 120. The source box 120 includes a receiver (HDMI reception unit) 121, a CDR unit 122, a deserializer 123, a processing unit 124, a serializer 125, and an E/O transmitter 126.

The receiver 121 receives baseband video data transmitted from the server 110 via the HDMI cable 130. The CDR unit 122 extracts a clock and data on the basis of the baseband video data received by the receiver 121. The clock extracted here is used in each unit at the subsequent stage.

The deserializer 123 converts the data extracted by the CDR unit 122 from serial data to parallel data. The processing unit 124 performs processing such as framing and header addition on the baseband video data in the HDMI format, which is the parallel data obtained by the deserializer 123, and converts the baseband video data into baseband video data in a format corresponding to the optical communication network 300.

The serializer 125 converts the baseband video data in a format corresponding to the optical communication network 300 obtained by the conversion in the processing unit 124 from parallel data to serial data. The E/O transmitter 126 converts baseband video data in a format corresponding to the optical communication network 300, which is serial data obtained by the serializer 125, from an electrical signal into an optical signal and transmits the optical signal to the optical communication network 300.

Figure 9:
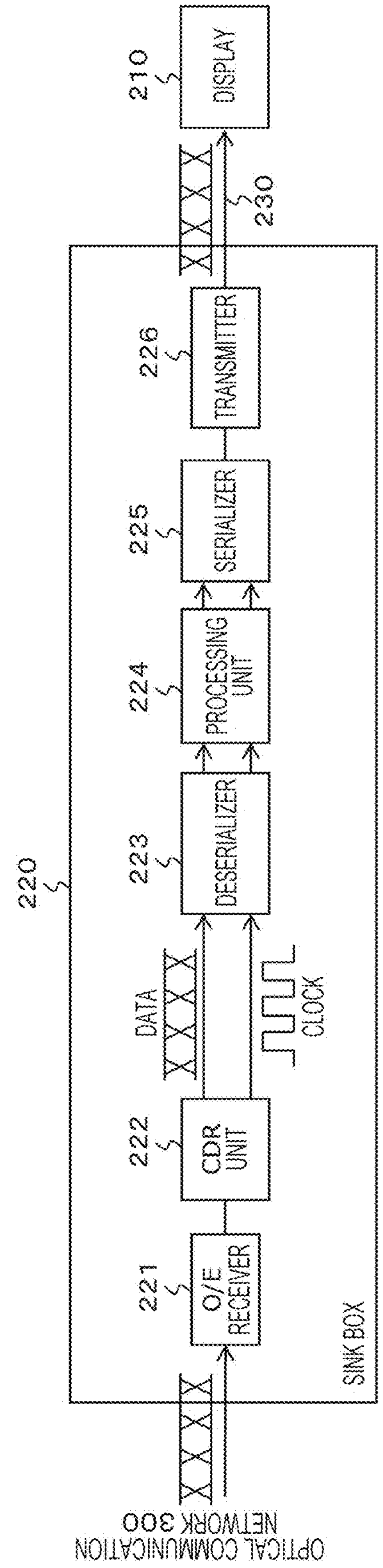
FIG. 9 is a diagram illustrating a configuration example of a sink box.

FIG. 9 illustrates a configuration example of the sink box 220. The sink box 220 includes an O/E receiver 221, a CDR unit 222, a deserializer 223, a processing unit 224, a serializer 225, and a transmitter (HDMI transmission unit) 226.

The O/E receiver 221 receives baseband video data transmitted from the source box 120 via the optical communication network 300, and converts the baseband video data from an optical signal to an electrical signal. The CDR unit 222 extracts a clock and data on the basis of baseband video data received by the O/E receiver 121. The clock extracted here is used in each unit at the subsequent stage.

The deserializer 223 converts the data extracted by the CDR unit 222 from serial data to parallel data. The processing unit 224 converts the baseband video data in a format corresponding to the optical communication network 300, which is parallel data obtained by the deserializer 223, into baseband video data in an HDMI format.

The serializer 225 converts the baseband video data in the HDMI format obtained by the conversion in the processing unit 224 from parallel data to serial data. The transmitter 226 transmits the baseband video data in the HDMI format, which is the serial data obtained by the serializer 225, to the display 210 via the HDMI cable 230.

In this embodiment, the processing unit 224 of the sink box 220 is configured to output dummy data capable of clock extraction in the display 210, which is the HDMI sink device at the subsequent stage, in a case where the occurrence of the jitter-fluctuation is detected.

Figure 10:
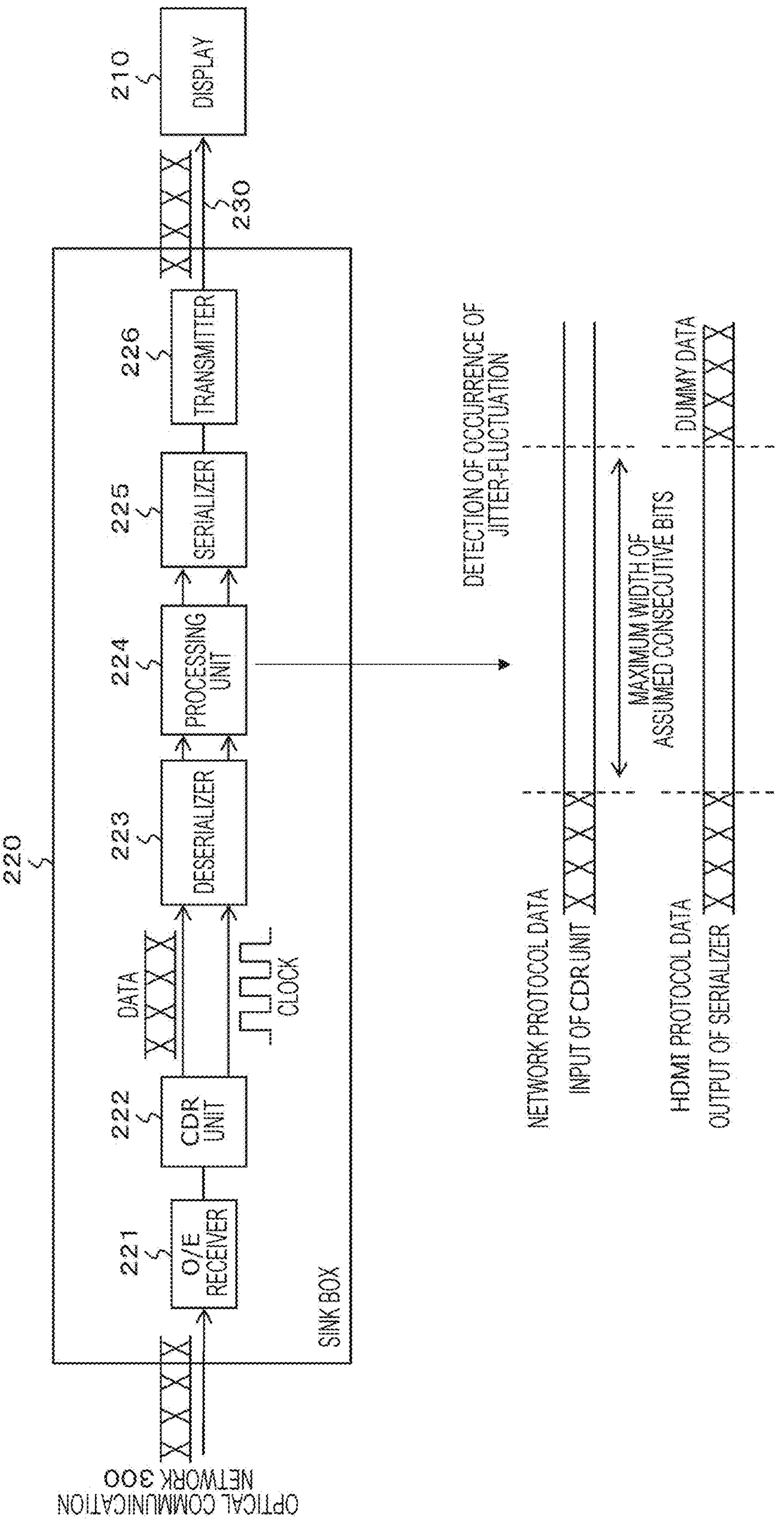
FIG. 10 is a diagram for explaining dummy data output in a case where the occurrence of jitter-fluctuation is detected in a processing unit of the sink box.

In this case, as illustrated in FIG. 10, for example, the processing unit 224 monitors a bit string of input network protocol data (baseband video data in a format corresponding to the optical communication network 300), and when the bit string exceeds a maximum width of consecutive identical bits assumed in a state in which the jitter-fluctuation does not occur, that is, a maximum width of consecutive bits of "1" bits or "0" bits, the processing unit detects that the jitter-fluctuation occurs, and switches an output of the HDMI protocol data (baseband video data in the HDMI format) to dummy data.

Here, the maximum width of consecutive identical bits in the network protocol data is, for example, the maximum width of consecutive identical bits assumed in the conversion coding in a case where the 16 bit/18 bit conversion coding of HDMI is used as it is in the coding of the network protocol data, and is the maximum width of consecutive identical bits assumed in the unique coding in a case where the coding of the network protocol data is unique coding different from the 16 bit/18 bit conversion coding of HDMI.

As described above, since the processing unit 224 of the sink box 220 is configured to output the dummy data in a case where the occurrence of the jitter-fluctuation is detected, even if the jitter-fluctuation occurs, the CDR of the display 210 at the subsequent stage can be prevented from being unlocked, link training when the jitter-fluctuation is resolved can be made unnecessary, and generation of a black image of several seconds each time the jitter-fluctuation occurs can be prevented.

In this case, the processing unit 224 may be configured to output copy video data in units of frames or lines as dummy data. In a case where the occurrence of the jitter-fluctuation is detected, the processing unit 224 is in a state of repeatedly outputting the video data of the normal frame or line immediately before the occurrence of the jitter-fluctuation, for example. In this case, by switching to the dummy data at the timing of the start of the next frame or the start of the line, it is possible to prevent the synchronization disturbance from occurring in the display video.

As described above, with the configuration in which the copy video data in units of frames or lines is output as the dummy data, it is possible to reduce the user's uncomfortable feeling about the disturbance of the display video due to the jitter-fluctuation in the display 210.

Note that, in a case where the resolution of the jitter-fluctuation is detected, the processing unit 224 switches the output from the dummy data to the baseband video data in the HDMI format obtained by converting the baseband video data in the format corresponding to the optical communication network 300 input from the deserializer 223, and returns to the normal state. In this case, the processing unit 224 monitors the input data, and detects that the jitter-fluctuation is resolved, for example, when the continuation of the "1" bits or the "0" bits is interrupted.

Furthermore, in this embodiment, the CDR unit 222 of the sink box 220 is configured to continuously output a clock in the same state as immediately after the occurrence of the jitter-fluctuation in a case where the occurrence of the jitter-fluctuation is detected (in this case, data from which a clock cannot be extracted).

Figure 11:
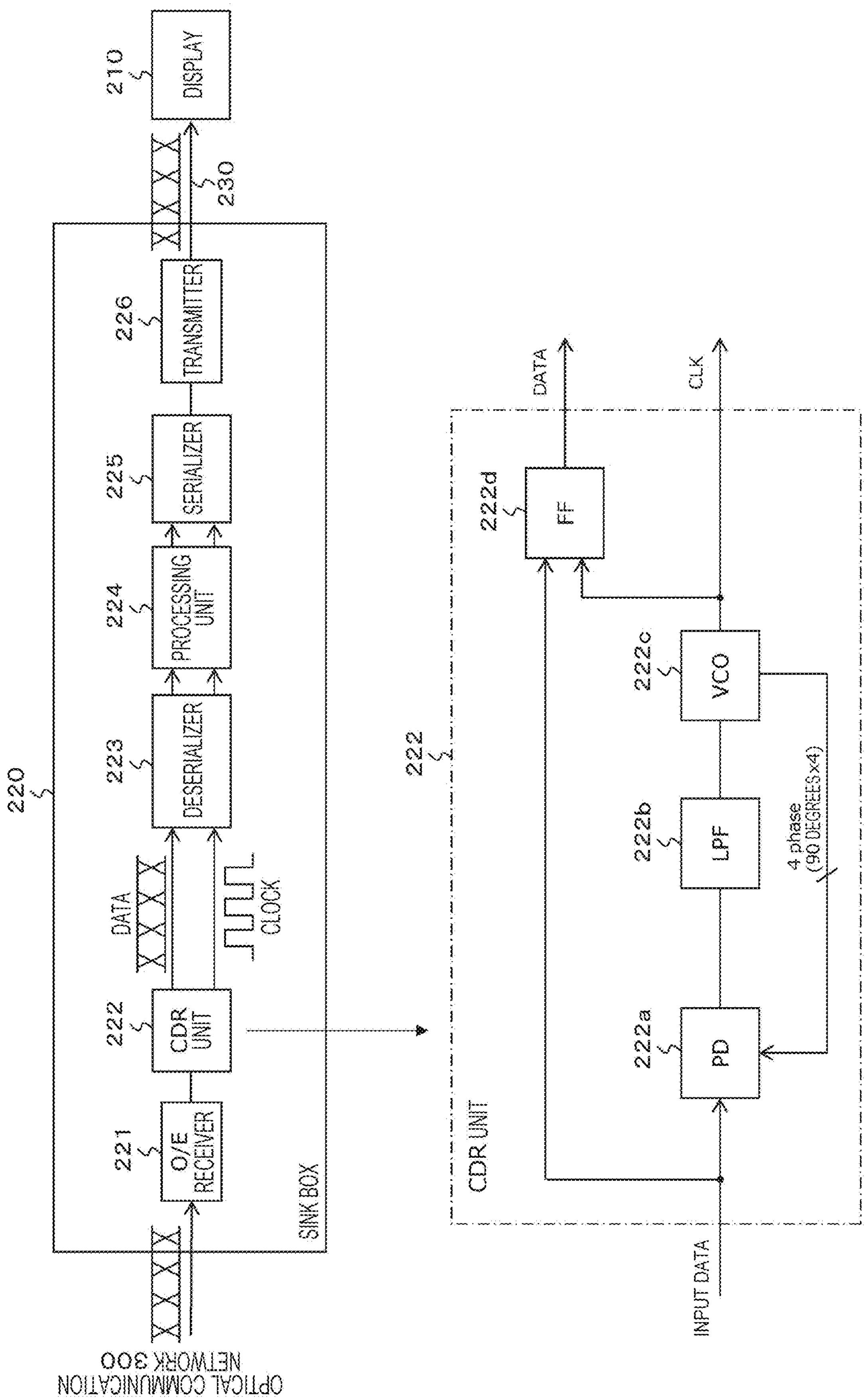
FIG. 11 is a diagram for explaining a general configuration of a CDR unit.

First, a case where the CDR unit 222 has a general configuration will be described. FIG. 11 illustrates a configuration example of the CDR unit 222 in that case. The CDR unit 222 includes a phase detector (PD) 222*a*, a low-pass filter 222*b*, a voltage-controlled oscillator (VCO) 222*c*, and a flip-flop (FF) 222*d*.

The phase detector 222*a* detects a phase difference between input data (baseband video data in a format corresponding to the optical communication network 300) and the extraction clock CLK that is an oscillation signal of the voltage-controlled oscillator 222*c*, and outputs an analog amount corresponding to the phase difference. The low-pass filter 222*b* smooths the output of the phase detector 222*a*. In the voltage-controlled oscillator 222*c*, the output of the low-pass filter 222*b* is input to the control voltage terminal and outputs the extraction clock CLK. The flip-flop 222*d* samples the input data with the extraction clock CLK and outputs the extracted data DATA.

In a case where the CDR unit 222 has such a general configuration, when the jitter-fluctuation occurs, the continuous "0" or the continuous "1" is misunderstood as correct data, and the frequency of the extraction clock CLK output from the voltage-controlled oscillator 222*c* is continuously decreased or continuously increased. Even if a dummy pattern is generated in the processing unit 224 at the subsequent stage as described above, the dummy pattern deviates from the HDMI specified data rate, and it becomes impossible to avoid the CDR of the display 210 from being unlocked.

Figure 12:
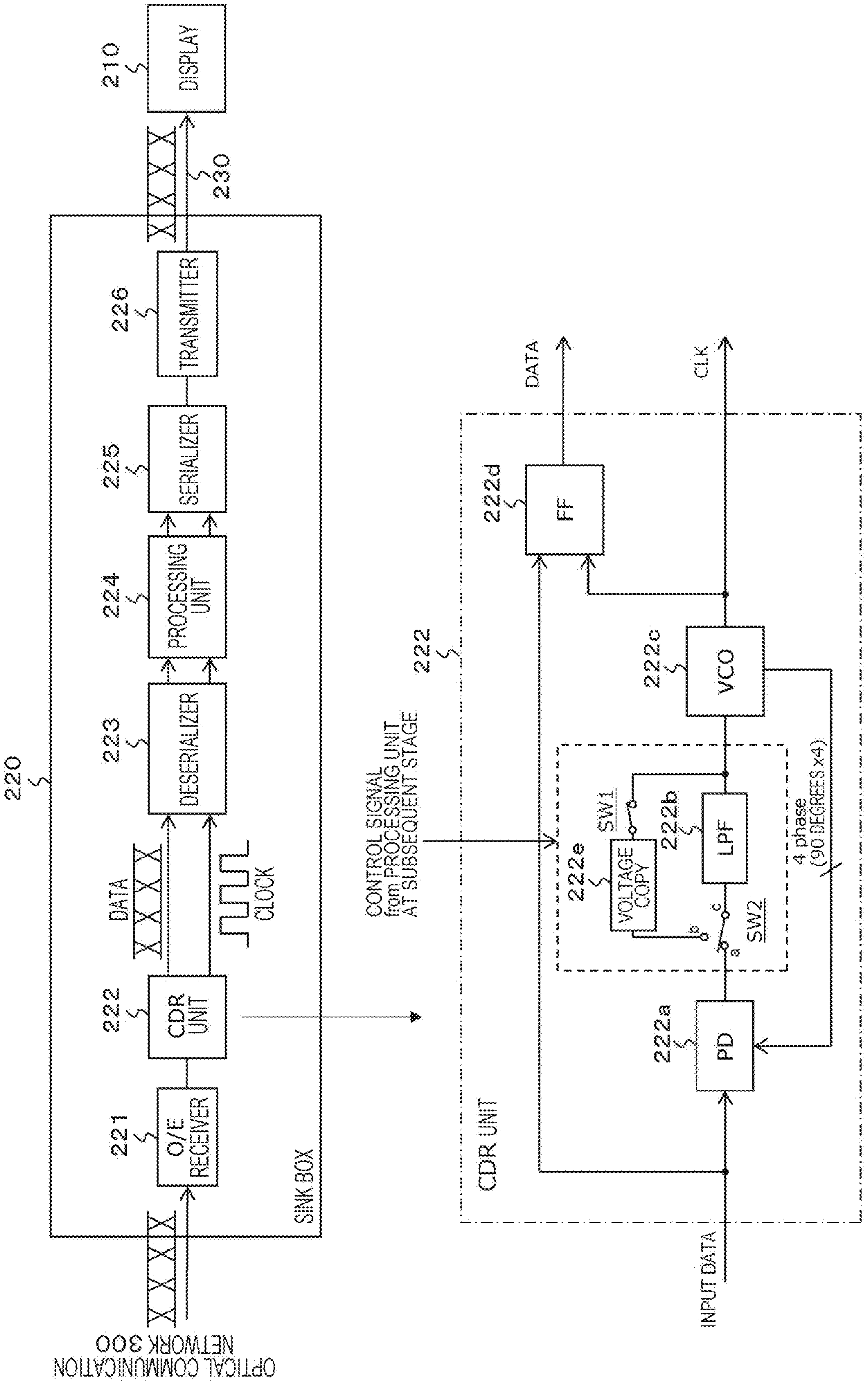
FIG. 12 is a diagram illustrating a configuration example of a CDR unit in the embodiment.

FIG. 12 illustrates a configuration example of the CDR unit 222 in this embodiment. In FIG. 12, portions corresponding to those in FIG. 11 are denoted by the same reference numerals, and detailed description thereof is appropriately omitted.

The CDR unit 222 illustrated in FIG. 12 includes a phase detector (PD) 222*a*, a low-pass filter 222*b*, a voltage-controlled oscillator (VCO) 222*c*, and a flip-flop (FF) 222*d*, and further includes a voltage copy circuit 222*e*, a changeover switch SW2, and a connection switch SW1. The voltage copy circuit 222*e* has a function of copying and holding the input voltage.

The output side of the phase detector 222*a* is connected to the fixed contact a of the changeover switch SW2, and the movable contact c of the changeover switch SW2 is connected to the input side of the low-pass filter 222*b*. Furthermore, The output side of the low-pass filter 222*b* is connected to the input side of the voltage copy circuit 222*e* via the connection switch SW1, and the output side of the voltage copy circuit 222 is connected to a fixed contact b of the changeover switch SW2.

In a normal state in which no jitter-fluctuation occurs, the movable contact c of the connection switch SW2 is connected to the fixed contact a, and the connection switch SW1 is turned on. Therefore, clock extraction and data extraction are performed similarly to the CDR unit 222 illustrated in FIG. 11. Furthermore, in this state, since the output side of the low-pass filter 222*b* is connected to the input side of the voltage copy circuit 222*e* via the connection switch SW1, in the voltage copy circuit 222*e*, the output of the low-pass filter 222*b* is always copied and held.

In a case where the occurrence of the jitter-fluctuation is detected, the movable contact c of the changeover switch SW2 is connected to the fixed contact b on the basis of the control signal (jitter-fluctuation detection signal) supplied from the processing unit 224, and the connection switch SW1 is turned off. Therefore, the voltage copy circuit 222*e* holds the output of the low-pass filter immediately after the occurrence of the jitter-fluctuation, and the held voltage is input to the low-pass filter 222*b*.

Therefore, the output of the low-pass filter 222*b* is fixed to the output immediately after the jitter-fluctuation occurs, and thus the voltage input to the control voltage terminal of the voltage-controlled oscillator 222*c* is fixed to the output of the low-pass filter 222*b* immediately after the jitter-fluctuation occurs. Therefore, the voltage-controlled oscillator 222*c* continues to output a clock in the same state as immediately after the jitter-fluctuation occurs.

Furthermore, thereafter, in a case where resolution of the jitter-fluctuation is detected, the movable contact c of the changeover switch SW2 is connected to the fixed contact a on the basis of the control signal (jitter-fluctuation resolution detection signal) supplied from the processing unit 224, and the connection switch SW1 is turned on. Therefore, the state returns to a normal state in which no jitter-fluctuation occurs.

As described above, in a case where the occurrence of the jitter-fluctuation is detected, the CDR unit 222 illustrated in FIG. 12 continues to output the clock in the same state as immediately after the occurrence of the jitter-fluctuation, and can satisfactorily perform the processing by using the clock continuously output from the CDR unit 222 at the subsequent stage. Furthermore, in the CDR unit 222, in a case where the occurrence of the jitter-fluctuation is detected, both the output voltage of the low-pass filter 222*b* and the oscillation frequency of the voltage-controlled oscillator 222*c* are fixed in a state immediately after the occurrence of the jitter-fluctuation, and thus link training when the jitter-fluctuation is eliminated becomes unnecessary.

Figure 13:
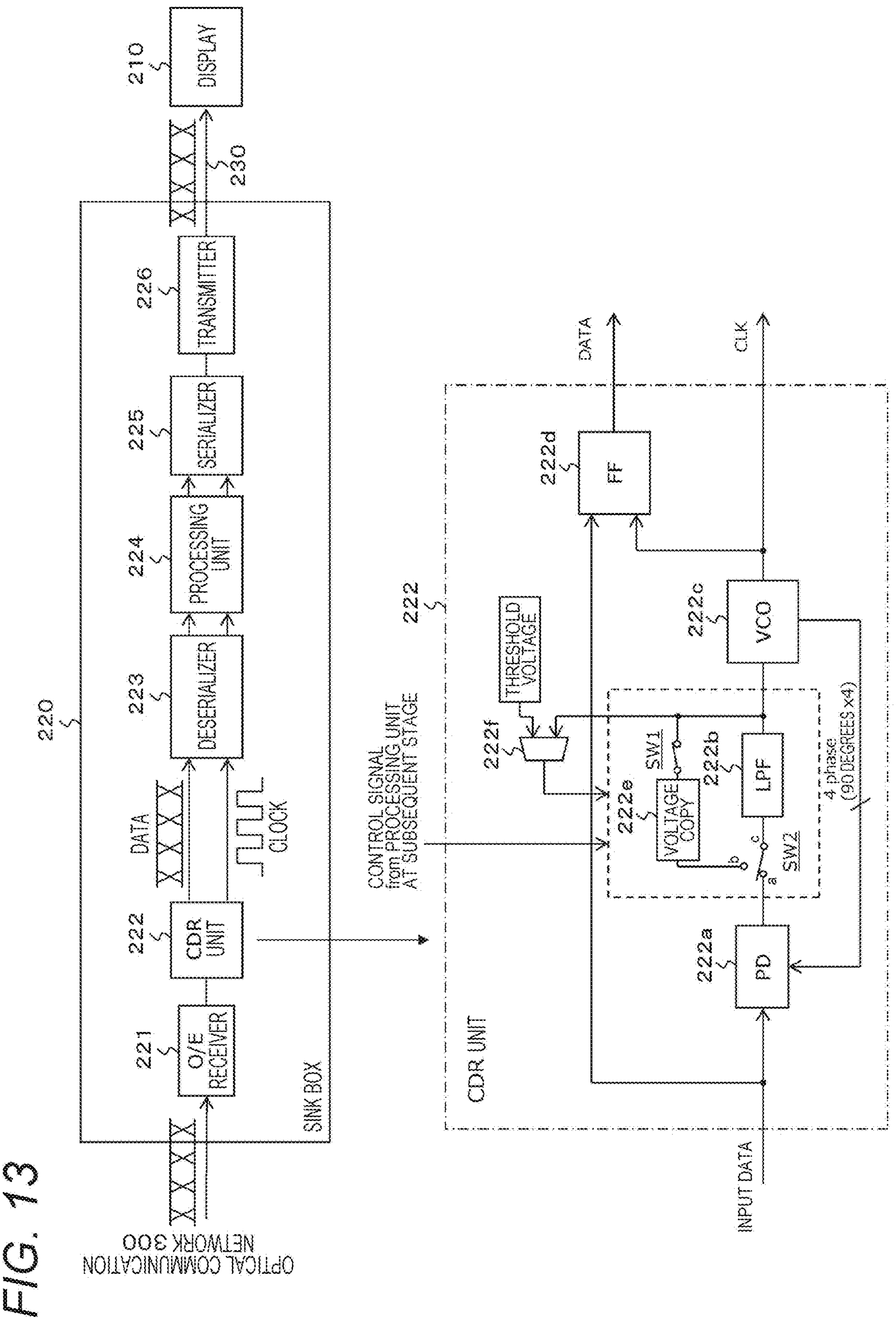
FIG. 13 is a diagram illustrating another configuration example of the CDR unit in the embodiment.

FIG. 13 illustrates another configuration example of the CDR unit 222 in this embodiment. In FIG. 13, portions corresponding to those in FIG. 12 are denoted by the same reference numerals, and detailed description thereof is appropriately omitted. In the configuration example of the CDR unit 222 illustrated in FIG. 12, both the jitter-fluctuation occurrence detection signal and the jitter-fluctuation resolution detection signal as control signals of the changeover switch SW2 and the connection switch SW1 are supplied from the processing unit 224 at the subsequent stage. In the configuration example of the CDR unit 222 illustrated in FIG. 13, the CDR unit 222 includes a circuit that generates a jitter-fluctuation occurrence detection signal.

The CDR unit 222 illustrated in FIG. 13 includes a phase detector (PD) 222*a*, a low-pass filter 222*b*, a voltage-controlled oscillator (VCO) 222*c*, a flip-flop (FF) 222, a voltage copy circuit 222*e*, a changeover switch SW2, and a connection switch SW1, and further includes a comparator 222*f*. Here, the comparator 222*f* constitutes a circuit that generates a jitter-fluctuation occurrence detection signal.

The comparator 222*f* compares the output of the low-pass filter 222*b* with a threshold voltage, and outputs a jitter-fluctuation occurrence detection signal when the output of the low-pass filter 222*b* deviates from a specified range. Here, the threshold voltage has an upper threshold and a lower threshold of the specified range. Furthermore, when the jitter-fluctuation occurs, the output of the low-pass filter 222*b* changes so as to deviate from the specified range. Therefore, by comparing the output of the low-pass filter 222*b* with the threshold voltage, the occurrence of jitter-fluctuation can be detected.

Although detailed description is omitted, the control of the changeover switch SW2 and the connection switch SW1 by the jitter-fluctuation occurrence detection signal output from the comparator 222*f* is similar to the case where the jitter-fluctuation occurrence detection signal is supplied from the processing unit 224 as in the CDR unit 222 illustrated in FIG. 12.

By having a circuit that generates the jitter-fluctuation occurrence detection signal in the CDR unit 222 in this manner, in a case where the jitter-fluctuation occurs, it is possible to eliminate the delay in the deserializer 223 and the processing unit 224 that occurs in a case where the jitter-fluctuation is detected in the processing unit 224 at the subsequent stage, and it is possible to detect the jitter-fluctuation more quickly and control the changeover switch SW2 and the connection switch SW1. Therefore, the output voltage of the low-pass filter 222*b* and the oscillation frequency of the voltage-controlled oscillator 222*c* can be fixed in a state close to the normal state.

Note that, in the configuration example of the CDR unit 222 illustrated in FIG. 13, the CDR unit 222 cannot detect that the jitter-fluctuation has been eliminated. Therefore, the jitter-fluctuation resolution detection signal is supplied from the processing unit 224 at the subsequent stage, similarly to the configuration example of the CDR unit 222 illustrated in FIG. 12. Although detailed description is omitted, the control of the changeover switch SW2 and the connection switch SW1 by the jitter-fluctuation resolution detection signal is similar to that in the CDR unit 222 illustrated in FIG. 12.

As described above, in a case where the occurrence of the jitter-fluctuation is detected, the CDR unit 222 illustrated in FIG. 13 continues to output the clock in the same state as immediately after the occurrence of the jitter-fluctuation, and can satisfactorily perform the processing by using the clock continuously output from the CDR unit 222 at the subsequent stage. Furthermore, in the CDR unit 222, in a case where the occurrence of the jitter-fluctuation is detected, both the output voltage of the low-pass filter 222*b* and the oscillation frequency of the voltage-controlled oscillator 222*c* are fixed in a state immediately after the occurrence of the jitter-fluctuation, and thus link training when the jitter-fluctuation is eliminated becomes unnecessary.

Figure 14:
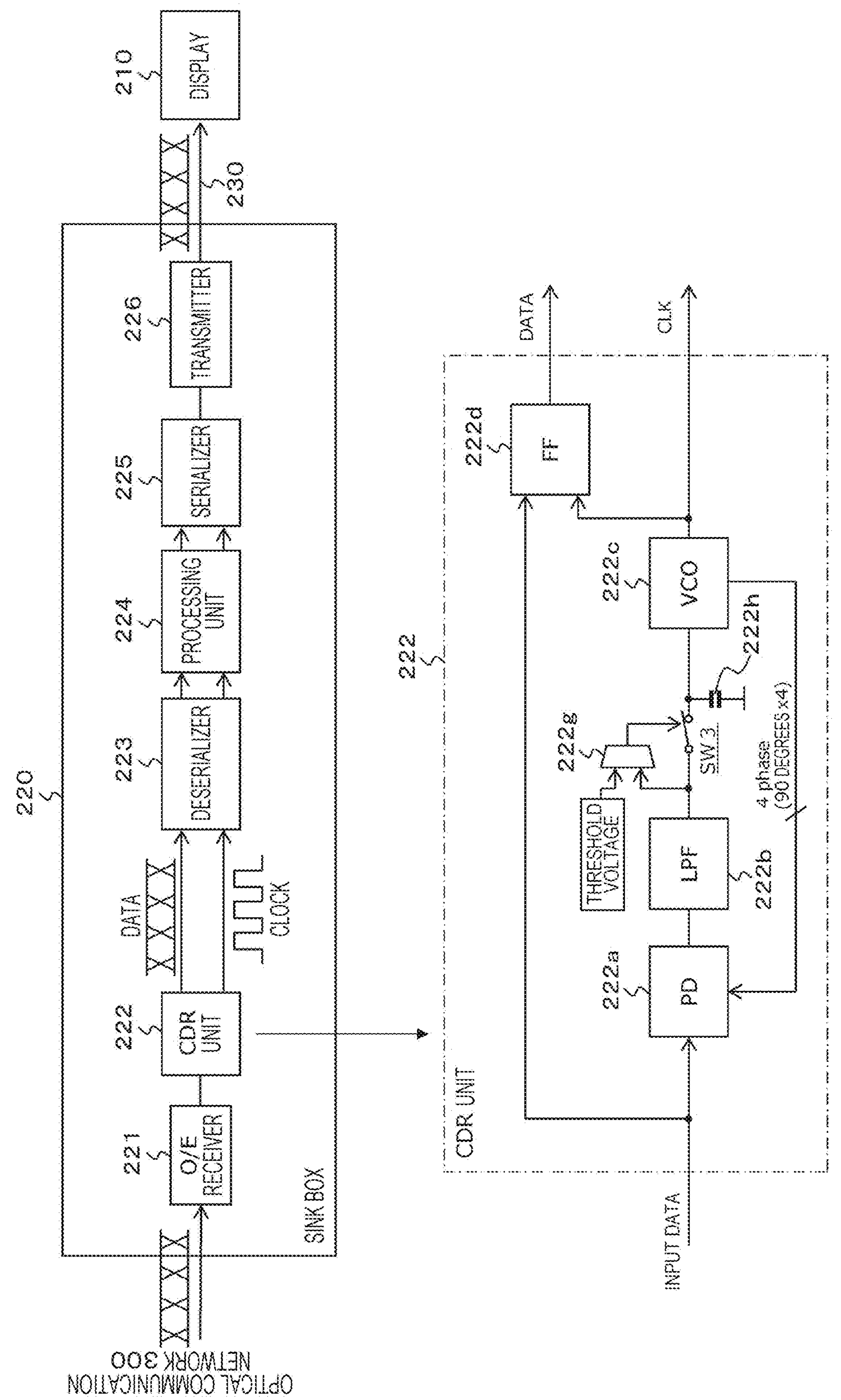
FIG. 14 is a diagram illustrating another configuration example of the CDR unit in the embodiment.

FIG. 14 illustrates still another configuration example of the CDR unit 222 in this embodiment. In FIG. 14, portions corresponding to those in FIG. 11 are denoted by the same reference numerals, and detailed description thereof is appropriately omitted. In the configuration example of the CDR unit 222 illustrated in FIG. 14, the occurrence of the jitter-fluctuation and the resolution of the jitter-fluctuation can be detected by the CDR unit 222 itself.

The CDR unit 222 illustrated in FIG. 14 includes a phase detector (PD) 222*a*, a low-pass filter 222*b*, a voltage-controlled oscillator (VCO) 222*c*, and a flip-flop (FF) 222*d*, and further includes a comparator 222*g*, a capacitor 222*h*, and a connection switch SW3. Here, the comparator 222*g* constitutes a circuit that generates a jitter-fluctuation occurrence detection signal and a jitter-fluctuation resolution detection signal.

The output side of the low-pass filter 222*b* is connected to the control voltage terminal of the voltage-controlled oscillator 222*c* via the connection switch SW3, and the control voltage terminal of the voltage-controlled oscillator 222*c* is grounded via the capacitor 222*h*. That is, the capacitor 222*h* is grounded between the control voltage terminal of the voltage-controlled oscillator 222*c* and the ground.

The comparator 222*g* compares the output of the low-pass filter 222*b* with a threshold voltage, outputs a jitter-fluctuation occurrence detection signal when the output of the low-pass filter 222*b* deviates from a specified range, and then outputs a jitter-fluctuation resolution detection signal when the output of the low-pass filter 222*b* returns to the specified range.

Here, the threshold voltage has an upper threshold and a lower threshold of the specified range. Furthermore, when the jitter-fluctuation occurs, the output of the low-pass filter 222*b* changes so as to deviate from the specified range, and thereafter, when the jitter-fluctuation is resolved, the output of the low-pass filter 222*b* changes so as to return to the specified range. Therefore, by comparing the output of the low-pass filter 222*b* with the threshold voltage, it is possible to detect the occurrence and resolution of the jitter-fluctuation.

The jitter-fluctuation occurrence detection signal and the jitter-fluctuation resolution detection signal output from the comparator 222*g* are ON/OFF control signals of the connection switch SW3. In this case, in a case where the jitter-fluctuation occurrence detection signal is output from the comparator 222*g* in a state where the connection switch SW3 is turned on, the connection switch SW3 is turned from on to off. Furthermore, thereafter, in a case where the jitter-fluctuation resolution detection signal is output from the comparator 222*g*, the connection switch SW3 is turned on from off.

In a normal state in which no jitter-fluctuation occurs, the connection switch SW3 is turned on. Therefore, clock extraction and data extraction are performed similarly to the CDR unit 222 illustrated in FIG. 11. Furthermore, in this state, the output (output voltage) of the low-pass filter 222*b* is always held by the capacitor 222*h*.

In a case where the occurrence of the jitter-fluctuation is detected, that is, in a case where the jitter-fluctuation occurrence detection signal is output from the comparator 222*g*, the connection switch SW3 is turned off. Therefore, the capacitor 222*h* holds the output of the low-pass filter immediately after the occurrence of the jitter-fluctuation, and thus, the voltage input to the control voltage terminal of the voltage-controlled oscillator 222*c* is fixed to the output of the low-pass filter 222*b* immediately after the occurrence of the jitter-fluctuation. Therefore, the voltage-controlled oscillator 222*c* continues to output a clock in the same state as immediately after the jitter-fluctuation occurs.

Furthermore, thereafter, in a case where resolution of the jitter-fluctuation is detected, that is, in a case where the jitter-fluctuation resolution detection signal is output from the comparator 222*g*, the connection switch SW3 is turned on. Therefore, the state returns to a normal state in which no jitter-fluctuation occurs.

As described above, in a case where the occurrence of the jitter-fluctuation is detected, the CDR unit 222 illustrated in FIG. 14 continues to output the clock in the same state as immediately after the occurrence of the jitter-fluctuation, and can satisfactorily perform the processing by using the clock continuously output from the CDR unit 222 at the subsequent stage. Furthermore, in the CDR unit 222, in a case where the occurrence of the jitter-fluctuation is detected, the oscillation frequency of the voltage-controlled oscillator 222*c* is fixed in a state immediately after the occurrence of the jitter-fluctuation, and thus, link training when the jitter-fluctuation is resolved becomes unnecessary.

As described above, in the transmission/reception system 100 illustrated in FIG. 7, the sink box 220 is configured to output dummy data capable of clock extraction in the CDR in the display 210 and send the dummy data to the display 210 in a case where the occurrence of the jitter-fluctuation is detected. Therefore, even if the jitter-fluctuation occurs, it is possible to avoid the CDR of the display 210 from being unlocked, it is possible to make link training when the jitter-fluctuation is resolved unnecessary, and it is possible to prevent a black image of several seconds from occurring every time the jitter-fluctuation occurs.

Furthermore, in the transmission/reception system 100 illustrated in FIG. 7, the CDR unit 222 of the sink box 220 is configured to continuously output a clock in the same state as immediately after the occurrence of the jitter-fluctuation in a case where the occurrence of the jitter-fluctuation is detected. Therefore, at the subsequent stage, the processing can be satisfactorily performed using the clock continuously output from the CDR unit 222. Furthermore, in the CDR unit 222, in a case where the occurrence of the jitter-fluctuation is detected, the oscillation frequency of the voltage-controlled oscillator 222*c* is fixed in a state immediately after the occurrence of the jitter-fluctuation, and thus, link training when the jitter-fluctuation is resolved becomes unnecessary.

2. MODIFICATIONS

Note that, in the above-described embodiment, an example in which the predetermined transmission path is the optical communication network 300 has been described, but the present invention is not limited thereto. The present technology can be similarly applied to other transmission paths in which jitter-fluctuation can occur.

Furthermore, in the above-described embodiment, an example in which the wired interface is the HDMI has been described. However, the wired interface to which the present technology can be applied is not limited to the HDMI, and may be another wired interface, for example, DisplayPort or the like.

Furthermore, in the above-described embodiment, the server 110 and the source box 120 are arranged on the transmission side of the baseband video data, and the display 210 and the sink box 220 are arranged on the reception side thereof. Here, a configuration in which the server 110 and the source box 120 on the transmission side are integrated and the display 210 and the sink box 220 on the reception side are integrated is also conceivable.

Figure 15A:
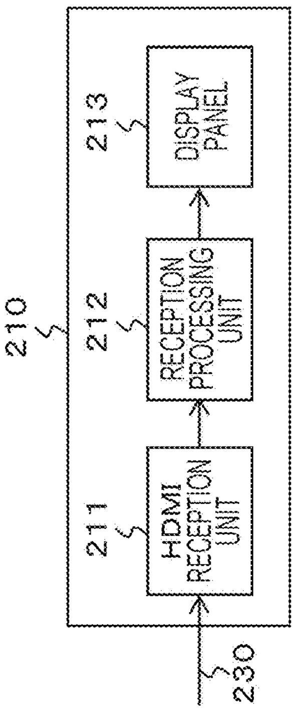
FIGS. 15A and 15B are diagrams for explaining a configuration example of a display in a case where a display on a reception side and a sink box are integrated.

FIG. 15A illustrates a configuration example of the display 210 before being integrated. The display 210 includes an HDMI reception unit 211 that receives a baseband video data, a reception processing unit 212 that generates video data for display by processing the baseband video data received by the HDMI reception unit 211, and a display panel 213 that displays a video based on the video data for display generated by the reception processing unit 212.

Figure 15B:
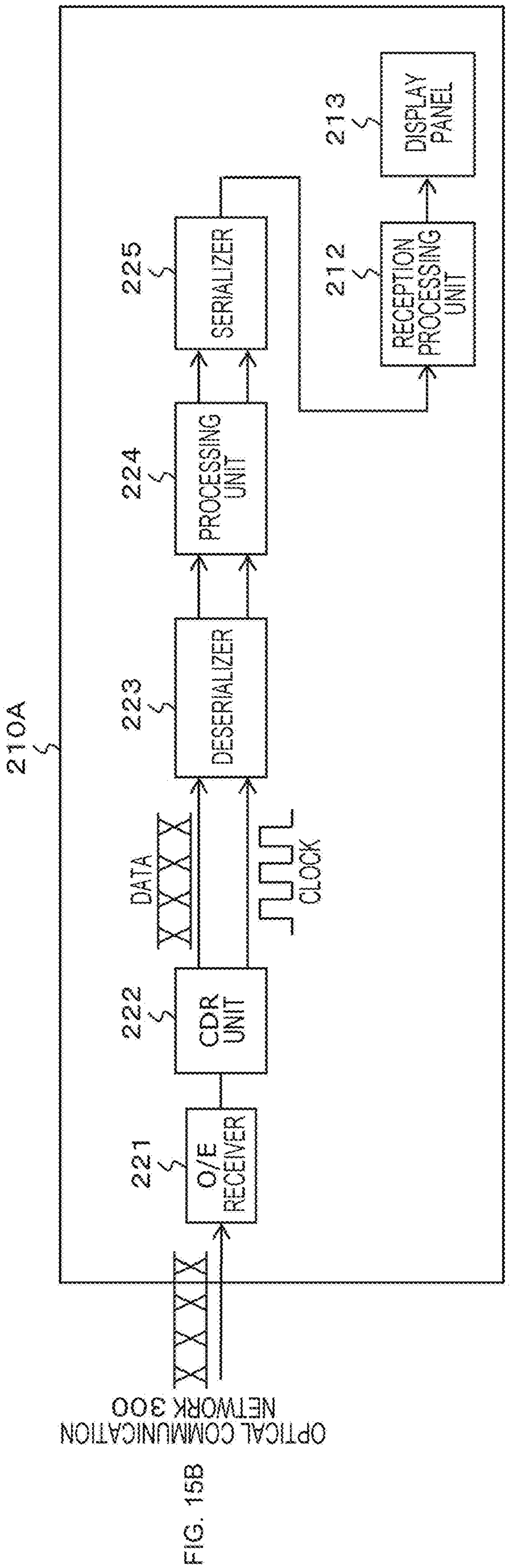

FIG. 15B illustrates a configuration example of a display 210A in a case where the display 210 and the sink box 220 on the reception side are integrated. In FIG. 15B, portions corresponding to those in FIGS. 10 and 15A are denoted by the same reference numerals, and detailed description thereof is appropriately omitted.

In this case, the processing unit 224 is configured to output copy video data in units of frames or lines as dummy data in a case where the jitter-fluctuation is detected, so that it is possible to reduce the user's uncomfortable feeling with respect to the disturbance of the display video due to the jitter-fluctuation. Furthermore, the CDR unit 222 has a configuration similar to any of FIGS. 12 to 14, for example, and is configured to continuously output a clock in the same state as immediately after the occurrence of the jitter-fluctuation in a case where the jitter-fluctuation is detected.

Furthermore, in the above-described embodiment, as a case where data not capable of clock extraction is input to the CDR unit 222, a case where jitter-fluctuation occurs, that is, a case where "1" continuous or "0" continuous data is input has been described, but the present invention is not limited thereto. In general, in a case where an input of data not capable of clock extraction is detected, it is conceivable that the CDR unit 222 continues to output a clock in a state immediately after the input of the data.

Furthermore, while the preferred embodiment of the present disclosure has been described in detail with reference to the accompanying drawings, the technical scope of the present disclosure is not limited to such example. It is apparent that a person having ordinary knowledge in the technical field of the present disclosure can achieve various variation examples or modification examples within the scope of the technical idea recited in claims, and it will be naturally understood that they also belong to the technical scope of the present disclosure.

Furthermore, the effects described in the present description are merely illustrative or exemplary and are not limited. That is, the technology according to the present disclosure can exhibit other effects that are apparent to those skilled in the art from the present description in addition to or instead of the above effects.

Furthermore, the present technology can also have the following configurations.

(1) A data processing device including:

a clock data recovery unit that extracts a clock and data on the basis of baseband video data in a first format corresponding to a predetermined transmission path, the baseband video data being input from the predetermined transmission path; and a processing unit that processes the extracted data on the basis of the extracted clock, in which the processing unit outputs dummy data capable of clock extraction at a subsequent stage in a case where occurrence of jitter-fluctuation is detected.

(2) The data processing device according to (1), in which the predetermined transmission path is an optical communication network.

(3) The data processing device according to (1) or (2), in which the processing unit outputs baseband video data in a second format, and the baseband video data in the second format is baseband video data corresponding to a predetermined wired interface.

(4) The data processing device according to (3), in which the predetermined wired interface is an HDMI or a DisplayPort.

(5) The data processing device according to any one of (1) to (4), in which the dummy data is copy video data in units of frames or lines.

(6) The data processing device according to any one of (1) to (5), in which the clock data recovery unit continues to output a clock in a state immediately after occurrence of jitter-fluctuation in a case where the occurrence of the jitter-fluctuation is detected.

(7) The data processing device according to (6), in which the clock data recovery unit includes:

a phase detector that detects a phase difference between baseband video data in the first format and an extraction clock and outputs an analog amount corresponding to the phase difference;

a low-pass filter that smooths an output of the phase detector; and a voltage-controlled oscillator in which an output of the low-pass filter is input to a control voltage terminal to output the extraction clock, and in a case where occurrence of jitter-fluctuation is detected, a voltage input to a control voltage terminal of the voltage-controlled oscillator is fixed to an output of the low-pass filter immediately after the occurrence of the jitter-fluctuation.

(8) The data processing device according to (7), in which the clock data recovery unit further includes a voltage copy circuit that copies and holds an output of the low-pass filter, and an output side of the low-pass filter is brought into a state of being disconnected from a state of being connected to the voltage copy circuit, and an input side of the low-pass filter is brought into a state in which a voltage held in the voltage copy circuit is input from a state in which an output of the phase detector is input, on the basis of a jitter-fluctuation occurrence detection signal.

(9) The data processing device according to (8), in which the jitter-fluctuation occurrence detection signal is generated by the processing unit.

(10) The data processing device according to (8), in which the clock data recovery unit further includes a circuit that compares an output of the low-pass filter with a threshold and generates the jitter-fluctuation occurrence detection signal.

(11) The data processing device according to any one of (8) to (10), in which an output side of the low-pass filter is brought into the connected state from the disconnected state with respect to the voltage copy circuit, and an input side of the low-pass filter is brought into a state in which an output of the phase detector is input from a state in which a voltage held in the voltage copy circuit is input, on the basis of the jitter-fluctuation resolution detection signal.

(12) The data processing device according to (11), in which the jitter-fluctuation resolution detection signal is generated by the processing unit.

(13) The data processing device according to (7), in which the clock data recovery unit further includes a capacitor disposed between a control voltage terminal of the voltage-controlled oscillator and ground, and an output side of the low-pass filter is brought into a disconnected state from a connected state with respect to a control voltage terminal of the voltage-controlled oscillator on the basis of a jitter-fluctuation occurrence detection signal.

(14) The data processing device according to (13), in which an output side of the low-pass filter is brought into a connected state from a disconnected state with respect to a control voltage terminal of the voltage-controlled oscillator on the basis of a jitter-fluctuation resolution detection signal.

(15) The data processing device according to (14), in which the clock data recovery unit further includes a circuit that compares an output of the low-pass filter with a threshold and generates the jitter-fluctuation occurrence detection signal and the jitter-fluctuation resolution detection signal.

(16) A data processing method including:

a clock data recovery procedure of extracting a clock and data on the basis of baseband video data input from a predetermined transmission path and having a format corresponding to the predetermined transmission path; and a processing procedure of processing the extracted data on the basis of the extracted clock, in which in the processing procedure, in a case where occurrence of jitter-fluctuation is detected, dummy data capable of clock extraction at a subsequent stage is output.

(17) A data processing device including:

a clock data recovery unit that extracts a clock and data on the basis of input data, in which in a case where an input of data not capable of clock extraction is detected, the clock data recovery unit continues to output a clock in a state immediately after an input of the data.

(18) The data processing device according to (17), in which the clock data recovery unit includes:

a phase detector that detects a phase difference between the input data and an extraction clock and outputs an analog amount corresponding to the phase difference;

a low-pass filter that smooths an output of the phase detector; and a voltage-controlled oscillator in which an output of the low-pass filter is input to a control voltage terminal to output the extraction clock, and in a case where occurrence of jitter-fluctuation is detected, a voltage input to a control voltage terminal of the voltage-controlled oscillator is fixed to an output of the low-pass filter immediately after the occurrence of the jitter-fluctuation.

(19) The data processing device according to (18), in which the clock data recovery unit further includes a voltage copy circuit that copies and holds an output of the low-pass filter, an output side of the low-pass filter is brought into a disconnected state from a connected state with respect to the voltage copy circuit, and an input side of the low-pass filter is brought into a state in which a voltage held in the voltage copy circuit is input from a state in which an output of the phase detector is input, on the basis of a jitter-fluctuation occurrence detection signal, and an output side of the low-pass filter is brought into the connected state from the disconnected state with respect to the voltage copy circuit, and an input side of the low-pass filter is brought into a state in which an output of the phase detector is input from a state in which a voltage held in the voltage copy circuit is input, on the basis of a jitter-fluctuation resolution detection signal.

(20) The data processing device according to (18), in which the clock data recovery unit further includes a capacitor disposed between a control voltage terminal of the voltage-controlled oscillator and ground, an output side of the low-pass filter is brought into a disconnected state from a connected state with respect to a control voltage terminal of the voltage-controlled oscillator on the basis of a jitter-fluctuation occurrence detection signal, and an output side of the low-pass filter is brought into a connected state from a disconnected state with respect to a control voltage terminal of the voltage-controlled oscillator on the basis of a jitter-fluctuation resolution detection signal.

REFERENCE SIGNS LIST

100 Transmission/reception system
110 Server
120 Source box
121 Receiver (HDMI reception unit)
122 CDR unit
123 Deserializer
124 Processing unit
125 Serializer
126 E/O transmitter
130 HDMI cable
210, 210A Display
211 HDMI reception unit
212 Reception processing unit
213 Display panel
220 Sink box
221 O/E receiver
222 CDR unit
222*a* Phase detector
222*b* Low-pass filter
222*c* Voltage-controlled oscillator
222*d* Flip-flop
222*e* Voltage copy circuit
222*f* Comparator
222*g* Comparator
222*h* Capacitor
223 Deserializer
224 Processing unit
225 Serializer
226 Transmitter (HDMI transmission unit)
230 HDMI cable
300 Optical communication network
SW1 Connection switch
SW2 Changeover switch
SW3 Connection switch

The invention claimed is:

1. A data processing device, comprising:
a clock data recovery unit configured to:
receive baseband video data from a specific transmission path; and
extract, based on the received baseband video data, a clock and data, wherein
the received baseband video data is in a first format corresponding to the specific transmission path, and
the clock data recovery unit includes:
a phase detector configured to:
detect a phase difference between the received baseband video data in the first format and the clock; and
output an analog amount corresponding to the phase difference;
a low-pass filter configured to smooth an output of the phase detector, wherein the output of the phase detector includes the analog amount; and
a voltage-controlled oscillator configured to output the clock wherein
an output of the low-pass filter is input to a control voltage terminal of the voltage-controlled oscillator, and
in a case where an occurrence of a jitter-fluctuation is detected,
a voltage input to the control voltage terminal is fixed to the output of the low-pass filter immediately after the occurrence of the jitter-fluctuation; and
the voltage-controlled oscillator is further configured to continue to output the clock in a state immediately after the occurrence of the jitter-fluctuation; and
a processing unit configured to:
process, based on the clock, the extracted data; and
in the case where the occurrence of the jitter-fluctuation is detected, output dummy data that is capable of clock extraction at a subsequent stage.

2. The data processing device according to claim 1, wherein the specific transmission path is an optical communication network.

3. The data processing device according to claim 1, wherein
the processing unit is further configured to output the received baseband video data in a second format, and
the received baseband video data in the second format corresponds to a specific wired interface.

4. The data processing device according to claim 3, wherein the specific wired interface is one of a high-definition multimedia interface (HDMI) or a DisplayPort.

5. The data processing device according to claim 1, wherein the dummy data is copy video data in one of units of frames or units of lines.

6. The data processing device according to claim 1, wherein the clock data recovery unit further includes a voltage copy circuit, the voltage copy circuit is configured to:

copy the output of the low-pass filter; and hold the output of the low-pass filter, an output side of the low-pass filter is switched from a first state to a second state based on a jitter-fluctuation occurrence detection signal, in the first state, the output side of the low-pass filter is connected to the voltage copy circuit, in the second state, the output side of the low-pass filter is disconnected from the voltage copy circuit, an input side of the low-pass filter is switched from a third state to a fourth state based on the jitter-fluctuation occurrence detection signal, in the third state, the output of the phase detector is input to the input side of the low-pass filter, in the fourth state, a voltage held in the voltage copy circuit is input to the input side of the low-pass filter.

7. The data processing device according to claim 6, wherein the processing unit is further configured to generate the jitter-fluctuation occurrence detection signal.

8. The data processing device according to claim 6, wherein the clock data recovery unit further includes a circuit that is configured to:

compare the output of the low-pass filter with a threshold; and generate the jitter-fluctuation occurrence detection signal based on the comparison of the output of the low-pass filter and the threshold.

9. The data processing device according to claim 6, wherein the output side of the low-pass filter is switched from the second state to the first state based on a jitter-fluctuation resolution detection signal, the input side of the low-pass filter is switched from the fourth state to the third state based on the jitter-fluctuation resolution detection signal.

10. The data processing device according to 9, wherein the processing unit is further configured to generate the jitter-fluctuation resolution detection signal.

11. The data processing device according to claim 1, wherein the clock data recovery unit further includes a capacitor between the control voltage terminal and a ground terminal, an output side of the low-pass filter is switched from a first state to a second state based on a jitter-fluctuation occurrence detection signal, in the first state, the output side of the low-pass filter is connected to the control voltage terminal, in the second state, the output side of the low-pass filter is disconnected from the control voltage terminal.

12. The data processing device according to claim 11, wherein the output side of the low-pass filter is switched from the second state to the first state based on a jitter-fluctuation resolution detection signal.

13. The data processing device according to claim 12, wherein the clock data recovery unit further includes a circuit that is configured to:

compare the output of the low-pass filter with a threshold; and generate each of the jitter-fluctuation occurrence detection signal and the jitter-fluctuation resolution detection signal based on the comparison of the output of the low-pass filter with the threshold.

14. A data processing method, comprising:

in a data processing device:

receiving baseband video data from a specific transmission path;

extracting, based on the received baseband video data, a clock and data, wherein the received baseband video data is in a format corresponding to the specific transmission path detecting a phase difference between the received baseband video data in the format and the clock;

outputting an analog amount corresponding to the phase difference;

smoothing the detected analog amount;

inputting the smoothed analog amount to a control voltage terminal of a voltage-controlled oscillator, in a case where an occurrence of a jitter-fluctuation is detected, fixing a voltage input to the control voltage terminal to an output of a low-pass filter immediately after the occurrence of the jitter-fluctuation; and continue outputting the clock in a state immediately after the occurrence of the jitter-fluctuation;

processing, based on the clock, the extracted data; and in the case where the occurrence of the jitter-fluctuation is detected, outputting dummy data that is capable of clock extraction at a subsequent stage.

15. A data processing device, comprising:

a clock data recovery unit configured to:

extract, based on input data, a clock and data;

detect an input of data that is incapable of clock extraction; and continue to output, based on the detection that the input of the data that is incapable of the clock extraction, the clock in a state immediately after the input of the data, wherein the clock data recovery unit includes:

a phase detector configured to:

detect a phase difference between the input data and the clock; and output an analog amount corresponding to the phase difference;

a low-pass filter configured to smooth an output of the phase detector, wherein the output of the phase detector includes the analog amount; and a voltage-controlled oscillator configured to output the clock, an output of the low-pass filter is input to a control voltage terminal of the voltage-controlled oscillator, and in a case where an occurrence of a jitter fluctuation is detected, a voltage input to the control voltage terminal is fixed to the output of the low-pass filter immediately after the occurrence of the jitter-fluctuation.

16. The data processing device according to claim 15, wherein the clock data recovery unit further includes a voltage copy circuit that is configured to:

copy the output of the low-pass filter; and hold the output of the low-pass filter, an output side of the low-pass filter is switched from a first state to a second state based on a jitter-fluctuation occurrence detection signal, in the first state, the output side of the low-pass filter is connected to the voltage copy circuit, in the second state, the output side of the low-pass filter is disconnected from the voltage copy circuit, an input side of the low-pass filter is switched from a third state to a fourth state based on the jitter-fluctuation occurrence detection signal, in the third state, the output of the phase detector is input to the input side of the low-pass filter, in the fourth state, a voltage held in the voltage copy circuit is input to the input side of the low-pass filter, the output side of the low-pass filter is switched from the second state to the first state based on a jitter-fluctuation resolution detection signal, and the input side of the low-pass filter is switched from the fourth state to the third state based on the jitter-fluctuation resolution detection signal.

17. The data processing device according to claim 15, wherein the clock data recovery unit further includes a capacitor between the control voltage terminal and a ground terminal, an output side of the low-pass filter is switched from a first state to a second state based on a jitter-fluctuation occurrence detection signal, in the first state, the output side of the low-pass filter is connected to the control voltage terminal, in the second state, the output side of the low-pass filter is disconnected from the control voltage terminal, the output side of the low-pass filter is switched from the second state to the first state based on a jitter-fluctuation resolution detection signal, and the output side of the low-pass filter is switched from the second state to the first state based on the jitter-fluctuation resolution detection signal.

* * * * *